US008556041B2

(12) United States Patent
Mustalahti et al.

(10) Patent No.: US 8,556,041 B2
(45) **Date of Patent: *Oct. 15, 2013**

(54) ELEVATOR WITH TRACTION SHEAVE

(75) Inventors: Jorma Mustalahti, Hyvinkää (FI); Esko Aulanko, Kerava (FI)

(73) Assignee: Kone Corporation, Helsinki (FI)

( * ) Notice: Subject to any disclaimer, the term of this patent is extended or adjusted under 35 U.S.C. 154(b) by 323 days.

This patent is subject to a terminal disclaimer.

(21) Appl. No.: 12/662,353

(22) Filed: Apr. 13, 2010

(65) Prior Publication Data

US 2010/0200337 A1 Aug. 12, 2010

Related U.S. Application Data

(60) Division of application No. 10/863,292, filed on Jun. 9, 2004, which is a continuation of application No. PCT/FI03/00012, filed on Jan. 9, 2003.

(30) Foreign Application Priority Data

Jan. 9, 2002 (FI) ..................................... 20020043

(51) Int. Cl.

| | |
|---|---|
| ***B66B 11/08*** | (2006.01) |
| ***B66B 15/04*** | (2006.01) |
| ***B66B 7/06*** | (2006.01) |
| ***B66D 3/04*** | (2006.01) |
| ***F16G 9/00*** | (2006.01) |
| ***D07B 1/06*** | (2006.01) |
| ***F16H 55/38*** | (2006.01) |

(52) U.S. Cl.
USPC ........... 187/254; 187/266; 187/414; 254/390; 74/89.22

(58) Field of Classification Search
USPC ......... 187/250–254, 261–266, 393, 404, 255; 474/205, 239, 260–272; 254/390, 391
IPC ....................... B66B 11/04,11/08, 15/04, 15/06
See application file for complete search history.

(56) References Cited

U.S. PATENT DOCUMENTS 1,625,084 A 4/1927 Hymans
3,141,386 A 7/1964 Loughridge .................... 91/361
(Continued)

FOREIGN PATENT DOCUMENTS

EP 0 578 237 A1 1/1994
EP 0631968 9/1996
(Continued)

OTHER PUBLICATIONS

Feyrer, Klaus "Drahtseile Bemessung, Betrieb, Sicherheit", Springer Verlag, Berlin, Heidelberg, 1994, pp. 1-32.*

(Continued)

*Primary Examiner* — William A Rivera
*Assistant Examiner* — Stefan Kruer
(74) *Attorney, Agent, or Firm* — Harness, Dickey & Pierce, P.L.C.

(57) ABSTRACT

An elevator includes a set of hoisting ropes supporting a counterweight and an elevator car moving on respective tracks, each hoisting rope having a substantially round cross-section, and a hoisting machine engaging the set of hoisting ropes via a traction sheave. The traction sheave has a plurality of rope grooves. Each of the plurality of rope grooves generally conforms to a substantially circular shape. Each of the plurality of rope grooves has an opening for receiving a hoisting rope from among the set of hoisting ropes. A coating is adhesively bonded to each of the plurality of rope grooves. Each hoisting rope has a diameter below 8 mm. Each hoisting rope is composed of steel wires having a strength exceeding 2000 N/mm$^2$. A contact angle between the set of hoisting ropes and the traction sheave is greater than about 180 degrees.

30 Claims, 11 Drawing Sheets

(56) References Cited

U.S. PATENT DOCUMENTS

| | | | | |
|---|---|---|---|---|
| 3,559,768 | A | 2/1971 | Cox | 187/257 |
| 3,645,519 | A * | 2/1972 | Schwarz et al. | 266/226 |
| 3,822,542 | A | 7/1974 | Naud et al. | |
| 4,022,010 | A | 5/1977 | Gladenbeck et al. | |
| 4,566,562 | A | 1/1986 | Suzuki et al. | |
| 4,591,025 | A * | 5/1986 | Honda | 187/266 |
| 4,624,097 | A | 11/1986 | Wilcox | |
| 4,756,388 | A | 7/1988 | Heikkinen | 187/266 |
| 4,807,723 | A | 2/1989 | Salmon et al. | |
| 4,895,223 | A | 1/1990 | Ekholm et al. | |
| 4,930,603 | A * | 6/1990 | Brenner | 187/385 |
| 4,952,249 | A | 8/1990 | Dambre | 205/210 |
| 5,025,893 | A * | 6/1991 | Saito | 187/266 |
| 5,054,987 | A * | 10/1991 | Thornton | 414/390 |
| 5,076,398 | A * | 12/1991 | Heikkinen | 187/266 |
| 5,278,484 | A * | 1/1994 | Hakala | 318/760 |
| 5,370,205 | A | 12/1994 | Vanhala | |
| 5,377,786 | A | 1/1995 | Nakagawa | |
| 5,429,211 | A | 7/1995 | Aulanko et al. | 187/254 |
| 5,490,577 | A | 2/1996 | Yoo | |
| 5,869,795 | A | 2/1999 | Miyazawa et al. | 187/291 |
| 5,894,910 | A | 4/1999 | Suur-Askola et al. | |
| 5,896,948 | A | 4/1999 | Suur-Askola et al. | |
| 5,899,300 | A | 5/1999 | Miller et al. | |
| 5,921,351 | A | 7/1999 | Schroder-Brumloop | 187/255 |
| 5,929,400 | A | 7/1999 | Colby et al. | 187/393 |
| 5,957,242 | A * | 9/1999 | Suter et al. | 187/266 |
| 5,984,052 | A | 11/1999 | Cloux et al. | 187/404 |
| 6,035,974 | A | 3/2000 | Richter et al. | |
| 6,193,016 | B1 * | 2/2001 | Hollowell et al. | 187/250 |
| 6,199,666 | B1 | 3/2001 | Aulanko et al. | 187/277 |
| 6,325,179 | B1 * | 12/2001 | Barreiro et al. | 187/393 |
| 6,364,061 | B2 | 4/2002 | Baranda et al. | 187/254 |
| 6,367,587 | B2 | 4/2002 | Hakala et al. | |
| 6,401,871 | B2 | 6/2002 | Baranda et al. | |
| 6,412,264 | B1 | 7/2002 | De Josez et al. | |
| 6,443,266 | B2 | 9/2002 | Murakami et al. | |
| 6,488,124 | B1 | 12/2002 | Yasuda et al. | |
| 6,513,792 | B1 * | 2/2003 | De Angelis | 254/374 |
| 6,601,828 | B2 | 8/2003 | Strbuncelj et al. | |
| 6,631,789 | B1 | 10/2003 | de Jong et al. | |
| 6,631,790 | B2 | 10/2003 | Mattlar et al. | |
| 6,667,110 | B1 | 12/2003 | Cordonnier et al. | |
| 6,739,433 | B1 | 5/2004 | Baranda et al. | 187/411 |
| 7,207,421 | B2 | 4/2007 | Aulanko et al. | |
| 7,222,698 | B2 | 5/2007 | Hanninen | |
| 7,225,901 | B2 | 6/2007 | Mustalahti et al. | |
| 8,020,669 | B2 * | 9/2011 | Aulanko et al. | 187/254 |
| 8,069,955 | B2 * | 12/2011 | Aulanko et al. | 187/254 |
| 2001/0045329 | A1 | 11/2001 | Swaybill | 187/373 |
| 2002/0000346 | A1 | 1/2002 | Baranda et al. | 187/254 |
| 2002/0023803 | A1 * | 2/2002 | Vaisanen | 187/292 |
| 2002/0056593 | A1 | 5/2002 | Adifon et al. | 187/254 |
| 2002/0125079 | A1 | 9/2002 | Mattlar et al. | |
| 2003/0089551 | A1 | 5/2003 | Kato et al. | 182/1 |
| 2003/0159891 | A1 | 8/2003 | Ach et al. | 187/266 |
| 2004/0016602 | A1 | 1/2004 | Aulanko et al. | |
| 2004/0016603 | A1 | 1/2004 | Aulanko et al. | |
| 2004/0035645 | A1 | 2/2004 | Orrmann | |
| 2004/0065513 | A1 * | 4/2004 | Aulanko et al. | 187/254 |
| 2004/0089502 | A1 * | 5/2004 | Martini | 187/290 |
| 2004/0129501 | A1 | 7/2004 | Wittur et al. | 187/254 |
| 2004/0154871 | A1 * | 8/2004 | Allerding et al. | 187/287 |
| 2005/0006180 | A1 | 1/2005 | Mustalahti et al. | |
| 2005/0060979 | A1 | 3/2005 | Aulanko et al. | |
| 2005/0126859 | A1 | 6/2005 | Aulanko et al. | |
| 2005/0236232 | A1 | 10/2005 | Mustalahti et al. | |
| 2005/0284705 | A1 | 12/2005 | Aulanko et al. | |
| 2006/0231345 | A1 | 10/2006 | Mustalahti et al. | |
| 2007/0000735 | A1 | 1/2007 | Hanninen | |
| 2008/0041666 | A1 | 2/2008 | Siikonen et al. | |

FOREIGN PATENT DOCUMENTS

| | | | |
|---|---|---|---|
| EP | 0794919 | | 9/1997 |
| EP | 0794920 | | 9/1997 |
| EP | 0631967 | | 12/1997 |
| EP | 1213250 | A1 | 6/2002 |
| EP | 1250280 | | 10/2002 |
| EP | 1347930 | | 10/2003 |
| EP | 1397304 | | 3/2004 |
| EP | 1463680 | | 10/2004 |
| EP | 1511683 | | 3/2005 |
| EP | 1517850 | | 3/2005 |
| EP | 1558514 | | 8/2005 |
| EP | 1567441 | | 8/2005 |
| EP | 1567442 | | 8/2005 |
| EP | 1590289 | | 11/2005 |
| EP | 1701904 | | 9/2006 |
| EP | 1855977 | | 11/2007 |
| FI | 4928 | U | 5/2001 |
| JP | 57-114061 | | 7/1982 |
| JP | 60-145170 | | 9/1985 |
| JP | 03-043196 | B2 | 7/1991 |
| JP | 05-171580 | | 7/1993 |
| JP | 05-171580 | A | 7/1993 |
| JP | 07-010434 | | 1/1995 |
| JP | 07016729 | A * | 1/1995 |
| JP | 07-061744 | A | 3/1995 |
| JP | 8-158275 | A | 6/1996 |
| JP | 9-021084 | | 1/1997 |
| JP | 11-157762 | A | 6/1999 |
| JP | 2000-095461 | A | 4/2000 |
| JP | 2000-153975 | A | 6/2000 |
| JP | 2001-26388 | A | 1/2001 |
| JP | 2001-262482 | A | 9/2001 |
| JP | 2003221176 | | 8/2003 |
| JP | 2004-520245 | A | 7/2004 |
| WO | WO 96/16892 | | 6/1996 |
| WO | WO 96/17798 | | 6/1996 |
| WO | WO 99/43589 | | 9/1999 |
| WO | WO 00/27739 | | 5/2000 |
| WO | WO 01/21522 | | 3/2001 |
| WO | WO 01/68973 | A1 | 9/2001 |
| WO | WO 02/46083 | | 6/2002 |
| WO | WO 02/053486 | A1 | 7/2002 |
| WO | WO 02/059028 | A2 | 8/2002 |
| WO | WO 03/000581 | | 1/2003 |
| WO | WO 03/057611 | | 6/2003 |
| WO | WO 03/104128 | | 12/2003 |
| WO | WO 03/104131 | | 12/2003 |
| WO | WO 2004/041699 | | 5/2004 |
| WO | WO 2004/041700 | | 5/2004 |
| WO | WO 2004/041704 | | 5/2004 |
| WO | WO 2004/067429 | | 8/2004 |
| WO | WO 2005/066057 | | 7/2005 |
| WO | WO 2006/095048 | | 9/2006 |

OTHER PUBLICATIONS

Feyrer, Klaus Wires Ropes Tension, Endurance, Reliability, Springer Verlag, Berlin, Heidelberg, 2007, Section 1, pp. 4-7 and 17-26.*

European Decision dated May 18, 2010, Appl. No. 03 000 339.6, pp. 18 and 21.*

International Search Report (PCT/ISA/210 and PCT/ISA/220).

"Safety rules for the construction and installation of lifts", The European Standard, BS EN 81-1:1998, pp. 1-7.

"Qualified Lift Examiner Training Textbook", Japan Building Equipment and Elevator Center Foundation, 2000, pp. 249, 255, 256, 327 (with partial English translation).

"Lift Glossary", The Japan Elevator Safety Centre Foundation, Oct. 1998, pp. 103, 172 (with partial English translation).

Official Journal of the European Communities, Second, Third, and Fourth Directives.

English language translation of a Japanese Patent Office Action dated May 13, 2008 for corresponding Japanese Patent Application No. 2003-557938.

Official Journal of the European Communities, Second Directive, Annex VI, p. 21.

(56) References Cited

OTHER PUBLICATIONS

Official Journal of the European Communities, Third Directive, Annex I, pp. 28, 29, 32 and 33.
Official Journal of the European Communities, Fourth Directive, Annex I, pp. 57, 58, and 61.
Tractielift Zonder Machinekamer, BouwWereld, Misset., Doetinchem, NL, No. 19, Oct. 11, 1996, pp. 66-68.
English-language translation of Office Action dated Oct. 28, 2009, issued in corresponding Korean Application No. 10-2004-7010679.
Janovsky, Lubomir, Elevator Mechanical Design, 1987,Ellis Horwood Ltd., p. 120.

* cited by examiner

ELEVATOR WITH TRACTION SHEAVE

PRIORITY STATEMENT

This application is a divisional application of U.S. patent application Ser. No. 10/863,292, filed on Jun. 9, 2004 (published as U.S. Patent Application Publication No. 2005/0006180 A1 on Jan. 13, 2005), and claims the associated benefit under 35 U.S.C. §120 and 35 U.S.C. §121. The entire contents of parent U.S. patent application Ser. No. 10/863,292, entitled "ELEVATOR", are incorporated herein by reference. U.S. patent application Ser. No. 10/863,292 is a continuation of and claims priority to Patent Cooperation Treaty (PCT) International Application No. PCT/FI03/00012, filed on Jan. 9, 2003, which designated the United States of America. PCT International Application No. PCT/FI03/00012 claims priority to Finnish patent application No. 20020043, filed on Jan. 9, 2002.

BACKGROUND

1. Field

The present invention relates to an elevator, as discussed below.

2. Description of Related Art

One of the objectives in elevator development work is to achieve an efficient and economical utilization of building space. In recent years, this development work has produced various elevator solutions without machine room, among other things. Good examples of elevators without machine room are disclosed in specifications EP 0 631 967 (A1) and EP 0 631 968. The elevators described in these specifications are fairly efficient in respect of space utilization as they have made it possible to eliminate the space required by the elevator machine room in the building without a need to enlarge the elevator shaft. In the elevators disclosed in these specifications, the machine is compact at least in one direction, but in other directions it may have much larger dimensions than a conventional elevator machine.

In these basically good elevator solutions, the space required by the hoisting machine limits the freedom of choice in elevator lay-out solutions. Some space is needed to provide for the passage of the hoisting ropes. It is difficult to reduce the space required by the elevator car itself on its track and likewise the space required by the counterweight, at least at a reasonable cost and without impairing elevator performance and operational quality. In a traction sheave elevator without machine room, mounting the hoisting machine in the elevator shaft is difficult, especially in a solution with machine above, because the hoisting machine is a sizeable body of considerable weight. Especially in the case of larger loads, speeds and/or hoisting heights, the size and weight of the machine are a problem regarding installation, even so much so that the required machine size and weight have in practice limited the sphere of application of the concept of elevator without machine room or at least retarded the introduction of said concept in larger elevators. If the size of the machine and the traction sheave of the elevator is reduced, then a further problem is often the question of how to ensure a sufficient grip between the hoisting ropes and the traction sheave.

Specification WO 99/43589 discloses an elevator suspended using flat belts in which relatively small diversion diameters on the traction sheave and diverting pulleys are achieved. However, the problem with this solution is the limitations regarding layout solutions, the disposition of components in the elevator shaft and the alignment of diverting pulleys. Also, the alignment of polyurethane-coated belts having a load-bearing steel component inside is problematic e.g. in a situation where the car is tilted. To avoid undesirable vibrations, an elevator so implemented needs to be rather robustly constructed at least as regards the machine and/or the structures supporting it. The massive construction of other parts of the elevator needed to maintain alignment between the traction sheave and diverting pulleys also increases the weight and cost of the elevator. In addition, installing and adjusting such a system is a difficult task requiring great precision. In this case, too, there is the problem of how to ensure sufficient grip between the traction sheave and the hoisting ropes.

On the other hand, to achieve a small rope diversion diameter, rope structures have been used in which the load-bearing part is made of artificial fiber. Such a solution is exotic and the ropes thus achieved are lighter than steel wire ropes, but at least in the case of elevators designed for the commonest hoisting heights, artificial-fiber ropes do not provide any substantial advantage, particularly because they are remarkably expensive as compared with steel wire ropes.

SUMMARY

The object of the invention is to achieve at least one of the following objectives. On the one hand, it is an aim the invention to develop the elevator without machine room further so as to allow more effective space utilization in the building and elevator shaft than before. This means that the elevator must be so constructed that it can be installed in a fairly narrow elevator shaft if necessary. On the other hand, it is an aim of the invention to reduce the size and/or weight of the elevator or at least those of its machine. A third objective is to achieve an elevator with a thin hoisting rope and/or small traction sheave in which the hoisting rope has a good grip/contact on the traction sheave.

The object of the invention should be achieved without impairing the possibility of varying the basic elevator layout.

The elevator of the invention is discussed below. Some embodiments of the elevator are characterized by what is presented in the claims. Other embodiments are also discussed in the description section of the present application. The inventive content of the application can also be defined differently than in the claims presented below. The inventive content may also consist of several separate inventions, especially if the invention is considered in the light of explicit or implicit sub-tasks or from the point of view of advantages or categories of advantages achieved. In this case, some of the definitions contained in the claims below may be superfluous from the point view of separate inventive concepts.

By applying the invention, one or more of the following advantages, among others, can be achieved:

- Due to a small traction sheave, a compact elevator and elevator machine are achieved
- By using a small coated traction sheave, the weight of the machine can easily be reduced even to about half of the weight of the machines now generally used in elevators without machine room. For example, in the case of elevators designed for a nominal load below 1000 kg, this means machines weighing 100-150 kg or even less. Via appropriate motor solutions and choices of materials, it is even possible to achieve machines weighing less than 100 kg.
- A good traction sheave grip and light components allow the weight of the elevator car to be considerably reduced, and correspondingly the counterweight can also be made lighter than in current elevator solutions.

- A compact machine size and thin, substantially round ropes permit the elevator machine to be relatively freely placed in the shaft. Thus, the elevator solution can be implemented in a fairly wide variety of ways in the case of both elevators with machine above and elevators with machine below.
- The elevator machine can be advantageously placed between the car and a shaft wall.
- All or at least part of the weight of the elevator car and counterweight can be carried by the elevator guide rails.
- In elevators applying the invention, an arrangement of centric suspension of the elevator car and counterweight can readily be achieved, thereby reducing the lateral supporting forces applied to the guide rails.
- Applying the invention allows effective utilization of the cross-sectional area of the shaft.
- The invention reduces the installation time and total installation casts of the elevator.
- The elevator is economical to manufacture and install because many of its components are smaller and lighter than those used before.
- The speed governor rope and the hoisting rope are usually different in respect of their properties and they can be easily distinguished from each other during installation if the speed governor rope is thicker than the hoisting ropes; on the other hand, the speed governor rope and the hoisting ropes may also be of identical structure, which will reduce ambiguities regarding these matters in elevator delivery logistics and installation.
- The light, thin ropes are easy to handle, allowing considerably faster installation.
- E.g. in elevators for a nominal load below 1000 kg and a speed below 2 m/s, the thin and strong steel wire ropes of the invention have a diameter of the order of only 3-5 mm.
- With rope diameters of about 6 mm or 8 mm, fairly large and fast elevators according to the invention can be achieved.
- The traction sheave and the rope pulleys are small and light as compared with those used in conventional elevators.
- The small traction sheave allows the use of smaller operating brakes.
- The small traction sheave reduces the torque requirement, thus allowing the use of a smaller motor with smaller operating brakes.
- Because of the smaller traction sheave, a higher rotational speed is needed to achieve a given car speed, which means that the same motor output power can be reached by a smaller motor.
- Either coated or uncoated ropes can be used.
- It is possible to implement the traction sheave and the rope pulleys in such a way that, after the coating on the pulley has been worn out, the rope will bite firmly on the pulley and thus a sufficient grip between rope and pulley in this emergency is maintained.
- The use of a small traction sheave makes it possible to use a smaller elevator drive motor, which means a reduction in drive motor acquisition/manufacturing costs.
- The invention can be applied in gearless and geared elevator motor solutions.
- Although the invention is primarily intended for use in elevators without machine room, it can also be applied in elevators with machine room.
- In the invention a better grip and a better contact between the hoisting ropes and the traction sheave are achieved by increasing the contact angle between them.
- Due to the improved grip, the size and weight of the car and counterweight can be reduced.
- The space saving potential of the elevator of the invention is increased.
- The weight of elevator car in relation to the weight of the counterweight can be reduced.
- The acceleration power required by the elevator is reduced and the torque required is also reduced.
- The elevator of the invention can be implemented using a lighter and smaller machine and/or motor.
- As a result of using a lighter and smaller elevator system, energy savings and at the same time cost savings are achieved.
- It is possible to place the machine in the free space above the counterweight, thus increasing the space saving potential of the elevator.
- By mounting at least the elevator hoisting machine, the traction sheave and a diverting pulley in a complete unit, which is fitted as a part of the elevator of the invention, considerable savings in installation time and costs will be achieved.

The primary area of application of the invention is elevators designed for transporting people and/or freight. In addition, the invention is primarily intended for use in elevators whose speed range, in the case of passenger elevators, is normally about or above 1.0 m/s but may also be e.g. only about 0.5 m/s. In the case of freight elevators, too, the speed is preferably at least about 0.5 m/s, although slower speeds can also be used with large loads.

In both passenger and freight elevators, many of the advantages achieved through the invention are pronouncedly brought out even in elevators for only 3-4 people, and distinctly already in elevators for 6-8 people (500-630 kg).

The elevator of the invention can be provided with elevator hoisting ropes twisted e.g. from round and strong wires. From round wires, the rope can be twisted in many ways using wires of different or equal thickness. In ropes applicable with the invention, the wire thickness is below 0.4 mm on an average. Well applicable ropes made from strong wires are those in which the average wire thickness is below 0.3 mm or even below 0.2 mm. For instance, thin-wired and strong 4 mm ropes can be twisted relatively economically from wires such that the mean wire thickness in the finished rope is in the range of 0.15 . . . 0.25 mm, while the thinnest wires may have a thickness as small as only about 0.1 mm. Thin rope wires can easily be made very strong. The invention employs rope wires having a strength of over 2000 N/mm$^2$. A suitable range of rope wire strength is 2300-2700 N/mm$^2$. In principle, it is possible to use rope wires as strong as about 3000 N/mm$^2$ or even more.

By increasing the contact angle using a diverting pulley, the grip between the traction sheave and the hoisting ropes can be improved. Therefore, it is possible to reduce the weight of the car and counterweight and their size can be reduced as well, thus increasing the space saving potential of the elevator. Alternatively or at the same time, it is possible to reduce the weight of the elevator car in relation to the weight of the counterweight. A contact angle of over 180° between the traction sheave and the hoisting rope is achieved by using one or more auxiliary diverting pulleys.

A preferred embodiment of the elevator of the invention is an elevator with machine above without machine room, the drive machine of which comprises a coated traction sheave and which uses thin hoisting ropes of substantially round cross-section. The contact angle between the hoisting ropes of the elevator and the traction sheave is larger than 180°. The elevator comprises a unit comprising a drive machine, a traction sheave and a diverting pulley fitted at a correct angle relative to the traction sheave, all this equipment being fitted on a mounting base. The unit is secured to the elevator guide rails.

BRIEF DESCRIPTION OF THE DRAWINGS

In the following, the invention will be described in detail by the aid of a few examples of its embodiments with reference to the attached drawings, wherein.

DETAILED DESCRIPTION OF EXAMPLE EMBODIMENTS

Figure 1:
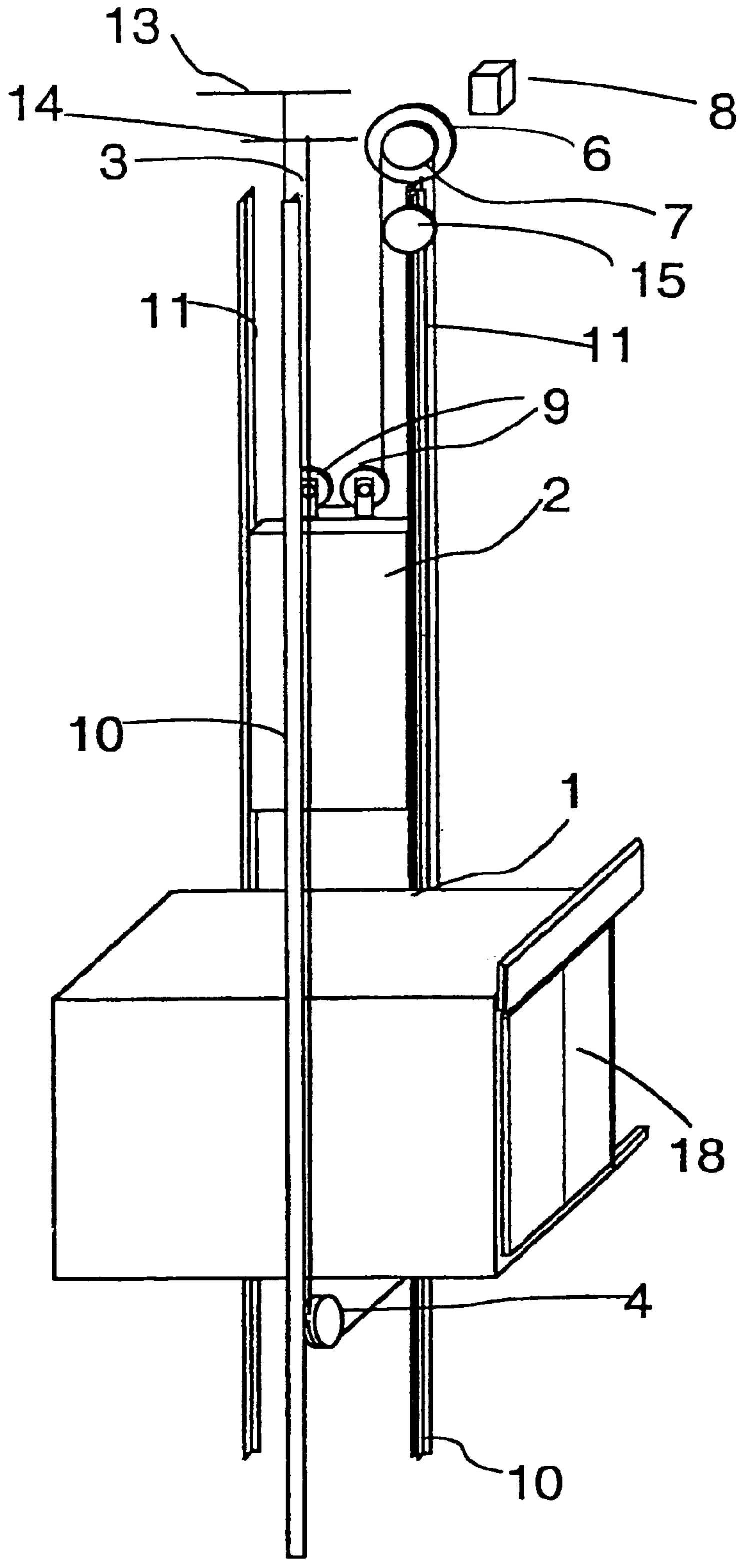
FIG. 1 presents a diagram representing a traction sheave elevator according to the invention.

FIG. 1 is a diagrammatic representation of the structure of an elevator. The elevator is preferably an elevator without machine room, with a drive machine 6 placed in the elevator shaft. The elevator shown in the figure is a traction sheave elevator with machine above. The passage of the hoisting ropes 3 of the elevator is as follows: One end of the ropes is immovably fixed to an anchorage 13 located in the upper part of the shaft above the path of a counterweight 2 moving along counterweight guide rails 11. From the anchorage, the ropes run downward and are passed around diverting pulleys 9 suspending the counterweight, which diverting pulleys 9 are rotatably mounted on the counterweight 2 and from which the ropes 3 run further upward via the rope grooves of diverting pulley 15 to the traction sheave 7 of the drive machine 6, passing around the traction sheave along rope grooves on the sheave. From the traction sheave 7, the ropes 3 run further downward back to diverting pulley 15, passing around it along the rope grooves and returning then back up to the traction sheave 7, over which the ropes run in the traction sheave rope grooves. From the traction sheave 7, the ropes 3 go further downwards via the rope grooves of diverting pulley 15 to the elevator car 1 moving along the car guide rails 10 of the elevator, passing under the car via diverting pulleys 4 used to suspend the elevator car on the ropes, and going then upward again from the elevator car to an anchorage 14 in the upper part of the elevator shaft, to which anchorage the second end of the ropes 3 is immovably fixed. Anchorage 13 in the upper part of the shaft, the traction sheave 7 and the diverting pulley 9 suspending the counterweight on the ropes are preferably so disposed in relation to each other that both the rope portion going from the anchorage 13 to the counterweight 2 and the rope portion going from the counterweight 2 to the traction sheave 7 are substantially parallel to the path of the counterweight 2. Similarly, a solution is preferred in which anchorage 14 in the upper part of the shaft, the traction sheave 7, diverting pulley 15 and the diverting pulleys 4 suspending the elevator car on the ropes are so disposed in relation to each other that the rope portion going from the anchorage 14 to the elevator car 1 and the rope portion going from the elevator car 1 via diverting pulley 15 to the traction sheave 7 are substantially parallel to the path of the elevator car 1. With this arrangement, no additional diverting pulleys are needed to define the passage of the ropes in the shaft. The roping arrangement between the traction sheave 7 and the diverting pulley 15 is referred to as Double Wrap roping, wherein the hoisting ropes are wrapped around the traction sheave two and/or more times. In this way, the contact angle can be increased in two and/or more stages. For example, in the embodiment presented in FIG. 1, a contact angle of 180°+180°, i.e. 360° between the traction sheave 7 and the hoisting ropes 3 is achieved. Double Wrap roping can be arranged in other ways, too, e.g. by placing the diverting pulley on the side of the traction sheave, in which case, as the hoisting ropes are passed twice around the traction sheave, a contact angle of 180°+90°=270° is obtained, or by placing the diverting pulley at some other appropriate position. The rope suspension acts in a substantially centric manner on the elevator car 1, provided that the rope pulleys 4 supporting the elevator car are mounted substantially symmetrically relative to the vertical center line passing via the center of gravity of the elevator car 1. A preferable solution is to dispose the traction sheave 7 and the diverting pulley 15 in such a way that the diverting pulley 15 will also function as a guide of the hoisting ropes 3 and as a damping pulley.

The drive machine 6 placed in the elevator shaft is preferably of a flat construction, in other words, the machine has a small thickness dimension as compared with its width and/or height, or at least the machine is slim enough to be accommodated between the elevator car and a wall of the elevator shaft. The machine may also be placed differently, e.g. by disposing the slim machine partly or completely between an imaginary extension of the elevator car and a shaft wall. The elevator shaft is advantageously provided with equipment required for the supply of power to the motor driving the traction sheave 7 as well as equipment for elevator control, both of which can be placed in a common instrument panel 8 or mounted separately from each other or integrated partly or wholly with the drive machine 6. The drive machine may be of a geared or gearless type. A preferable solution is a gearless machine comprising a permanent magnet motor. Another advantageous solution is to build a complete unit comprising both an elevator drive machine with a traction sheave and one or more diverting pulleys with bearings in a correct operating angle relative to the traction sheave. The operating angle is determined by the roping used between the traction sheave an the diverting pulley/pulleys, which defines the way in which the mutual positions and angle between the traction sheave and diverting pulley/diverting pulleys relative to each other are fitted in the unit. This unit can be mounted in place as a unitary aggregate in the same way as a drive machine. The drive machine may be fixed to a wall of the elevator shaft, to the ceiling, to a guide rail or guide rails or to some other structure, such as a beam or frame. In the case of an elevator with machine below, a further possibility is to mount the machine on the bottom of the elevator shaft. FIG. 1 illustrates the economical 2:1 suspension, but the invention can also be implemented in an elevator using a 1:1 suspension ratio, in other words, in an elevator in which the hoisting ropes are connected directly to the counterweight and elevator car without diverting pulleys. Other suspension arrangements are also possible in an implementation of the invention. For example, an elevator according to the invention can be implemented using a suspension ratio of 3:1, 4:1 or even higher suspension ratios. The counterweight and the elevator car may also be suspended in such manner that the counterweight is suspended using a suspension ratio of n:1 while the elevator car is suspended with a suspension ratio of m:1, where m is an integer at least equal to 1 and n is an integer greater than m. The elevator presented in the figure has automatic telescoping doors, but other types of automatic doors or turning doors may also be used within the framework of the invention.

Figure 2:
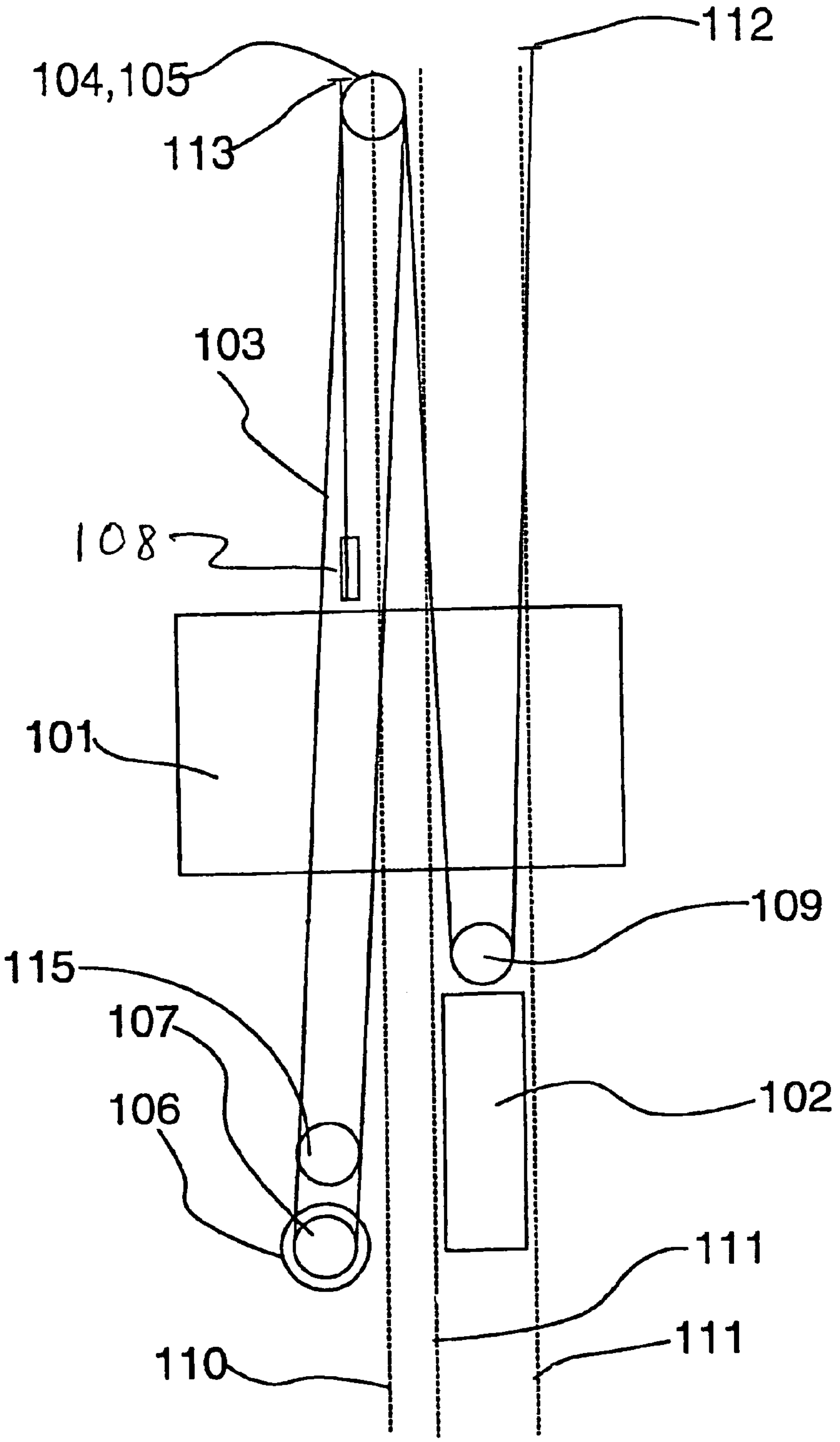
FIG. 2 presents a diagram representing another traction sheave elevator according to the invention.

FIG. 2 presents a diagram representing another traction sheave elevator according to the invention. In this elevator, the ropes go upward from the machine. This type of elevator is generally a traction sheave elevator with machine below. The elevator car 101 and the counterweight 102 are suspended on the hoisting ropes 103 of the elevator. The elevator drive machine unit 106 is mounted in the elevator shaft, preferably in the lower part of the shaft, a diverting pulley 115 is mounted near the drive machine unit 106, said diverting pulley allowing a sufficiently large contact angle to be achieved between the traction sheave 107 and the hoisting ropes 103. The hoisting ropes are passed via diverting pulleys 104,105 provided in the upper part of the elevator shaft to the car 101 and to the counterweight 102. Diverting pulleys 104,105 are placed in the upper part of the shaft and preferably separately mounted with bearings on the same axle so that they can rotate independently of each other. By way of example, in the elevator in FIG. 2, Double Wrap roping is also applied in an elevator with machine below.

The elevator car 101 and the counterweight 102 move in the elevator shaft along elevator and counterweight guide rails 110,111 guiding them.

In FIG. 2, the hoisting ropes run as follows: One end of the ropes is fixed to an anchorage 112 in the upper part of the shaft, from where it goes downward to the counterweight 102. The counterweight is suspended on the ropes 103 via a diverting pulley 109. From the counterweight, the ropes go further upward to a first diverting pulley 105 mounted on an elevator guide rail 110, and from the diverting pulley 105 further via the rope grooves of diverting pulley 115 to the traction sheave 107 driven by the drive machine 106. From the traction sheave, the ropes go again upwards to diverting pulley 115, and having wrapped around it they go back to the traction sheave 107. From the traction sheave 107, the ropes go again upwards via the rope grooves of diverting pulley 115 to diverting pulley 104, and having wrapped around this pulley they pass via diverting pulleys 108 mounted on the top of the elevator car and then go further to an anchorage 113 in the upper part of the elevator shaft, where the other end of the hoisting ropes is fixed. The elevator car is suspended on the hoisting ropes 103 by means of diverting pulleys 108. In the hoisting ropes 103, one or more of the rope portions between the diverting pulleys or between the diverting pulleys and the traction sheave or between the diverting pulleys and the anchorages may deviate from an exact vertical direction, a circumstance that makes it easy to provide a sufficient distance between different rope portions or a sufficient distance between the hoisting ropes and the other elevator components. The traction sheave 107 and the hoisting machine 106 are preferably disposed somewhat aside from the path of the elevator car 101 as well as that of the counterweight 102, so they can be easily placed almost at any height in the elevator shaft below the diverting pulleys 104 and 105. If the machine is not placed directly above or below the counterweight or elevator car, this will allow a saving in shaft height. In this case, the minimum height of the elevator shaft is exclusively determined on the basis of the length of the paths, of the counterweight and elevator car and the safety clearances needed above and below these. In addition, a smaller space at the top or bottom of the shaft will be sufficient due to the reduced rope pulley diameters as compared with earlier solutions, depending on how the rope pulleys are mounted on the elevator car and/or on the frame of the elevator car.

Figure 3:
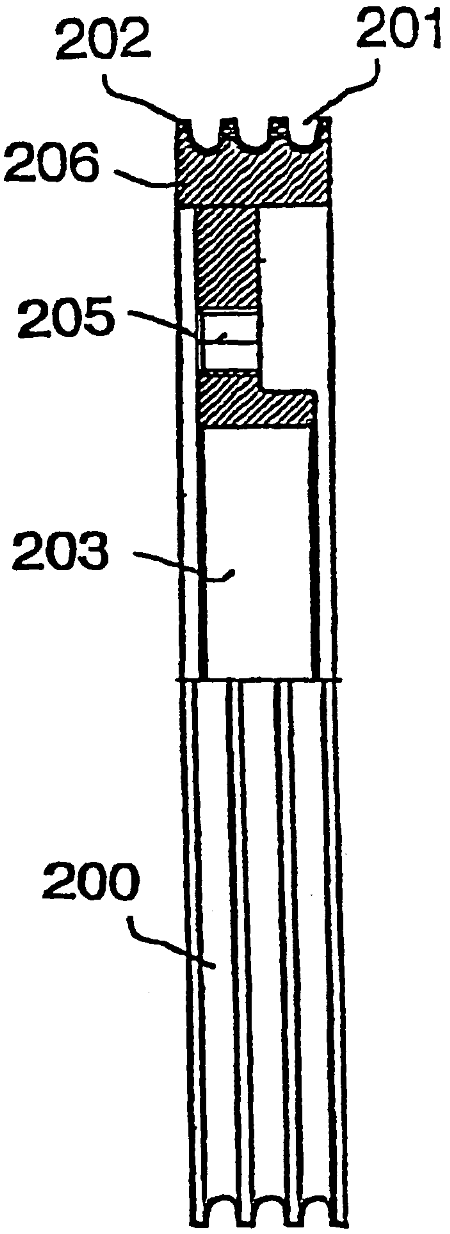
FIG. 3 presents a rope sheave applying the invention.

FIG. 3 presents a partially sectioned view of a rope pulley 200 applying the invention. The rim 206 of the rope pulley is provided with rope grooves 201, which are covered by a coating 202. Provided in the hub of the rope pulley is a space 203 for a bearing used to mount the rope pulley. The rope pulley is also provided with holes 205 for bolts, allowing the rope pulley to be fastened by its side to an anchorage in the hoisting machine 6, e.g., to a rotating flange, to form a traction sheave 7, so that no bearing separate from the hoisting machine is needed. The coating material used on the traction sheave and the rope pulleys may consist of rubber, polyurethane, or a corresponding elastic material that increases friction. The material of the traction sheave and/or rope pulleys may also be so chosen that, together with the hoisting rope used, it forms a material pair such that the hoisting rope will bite into the pulley after the coating on the pulley has been worn out. This ensures a sufficient grip between the rope pulley 200 and the hoisting rope 3 in an emergency where the coating 202 has been worn out from the rope pulley 200. This feature allows the elevator to maintain its functionality and operational reliability in the situation referred to. The traction sheave and/or the rope pulleys can also be manufactured in such manner that only the rim 206 of the rope pulley 200 is made of a material forming a grip-increasing material pair with the hoisting rope 3. The use of strong hoisting ropes that are considerably thinner than normal allows the traction sheave and the rope pulleys to be designed to considerably smaller dimensions and sizes than when normal-sized ropes are used. This also makes it possible to use a motor of a smaller size with a lower torque as the drive motor of the elevator, which leads to a reduction in the acquisition costs of the motor. For example, in an elevator according to the invention designed for a nominal load below 1000 kg (e.g., a rated load below 1000 kg), the traction sheave diameter is preferably 120-200 mm, but it may even be less than this. The traction sheave diameter depends on the thickness of the hoisting ropes used. In the elevator of the invention, the use of a small traction sheave, e.g. in the case of elevators for a nominal load below 1000 kg, makes it possible to achieve a machine weight even as low as about one half of the weight of currently used machines, which means producing elevator machines weighing 100-150 kg or even less. In the invention, the machine is understood as comprising at least the traction sheave, the motor, the machine housing structures and the brakes.

The weight of the elevator machine and its supporting elements used to hold the machine in place in the elevator shaft is at most about ⅕ of the nominal load. If the machine is exclusively or almost exclusively supported by one or more elevator and/or counterweight guide rails, then the total weight of the machine and its supporting elements may be less than about ⅙ or even less than ⅛ of the nominal load. Nominal load of an elevator means a load defined for elevators of a given size. The supporting elements of the elevator machine may include, e.g., a beam, carriage, or suspension bracket used to support or suspend the machine on/from a wall structure or ceiling of the elevator shaft or on the elevator or counterweight guide rails, or clamps used to hold the machine fastened to the sides of the elevator guide rails. It will be easy to achieve an elevator in which the machine deadweight without supporting elements is below 1/7 of the nominal load or even about 1/10 of the nominal load or still less. Basically, the ratio of machine weight to nominal load is given for a conventional elevator in which the counterweight has a weight substantially equal to the weight of an empty car plus half the nominal load. As an example of machine weight in the case of an elevator of a given nominal weight when the fairly common 2:1 suspension ratio is used with a nominal load of 630 kg, the combined weight of the machine and its supporting elements may be only 75 kg when the traction sheave diameter is 160 mm and hoisting ropes having a diameter of 4 mm are used, in other words, the total weight of the machine and its supporting elements is about 1/8 of the nominal load of the elevator. As another example, using the same 2:1 suspension ratio, the same 160 mm traction sheave diameter and the same 4 mm hoisting rope diameter, in the case of an elevator for a nominal load of about 1000 kg, the total weight of the machine and its supporting elements is about 150 kg, so in this case the machine and its supporting elements have a total weight equaling about 1/6 of the nominal load. As a third example, let us consider an elevator designed for a nominal load of 1600 kg. In this case, when the suspension ratio is 2:1, the traction sheave diameter 240 mm and the hoisting rope diameter 6 mm, the total weight of the machine and its supporting elements will be about 300 kg, i.e., about 1/5 of the nominal load. By varying the hoisting rope suspension arrangements, it is possible to reach a still lower total weight of the machine and its supporting elements. For example, when a 4:1 suspension ratio, a 160 mm traction sheave diameter and a 4 mm hoisting rope diameter are used in an elevator designed for a nominal load of 500 kg, a total weight of the hoisting machine and its supporting elements of about 50 kg will be achieved. In this case, the total weight of the machine and its supporting elements is as small as only about 1/10 of the nominal load.

Figure 4:
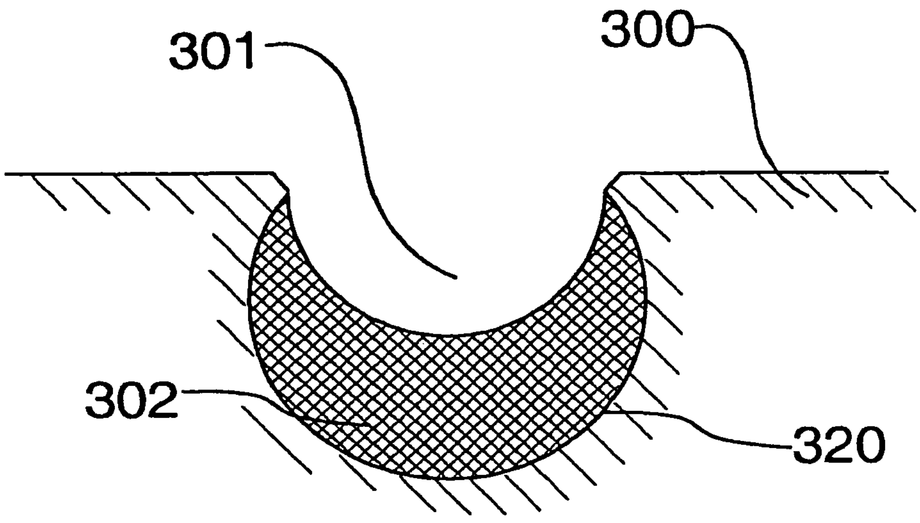
FIG. 4 presents a coating solution according to the invention.

FIG. 4 presents a solution in which the rope groove 301 is in a coating 302, which is thinner at the sides of the rope groove than at the bottom. In such a solution, the coating is placed in a basic groove 320 provided in the rope pulley 300 so that deformations produced in the coating by the pressure imposed on it by the rope will be small and mainly limited to the rope surface texture sinking into the coating. Such a solution often means in practice that the rope pulley coating consists of rope groove-specific sub-coatings separate from each other, but considering manufacturing or other aspects it may be appropriate to design the rope pulley coating so that it extends continuously over a number of grooves.

By making the coating thinner at the sides of the groove than at its bottom, the strain imposed by the rope on the bottom of the rope groove while sinking into the groove is avoided or at least reduced. As the pressure cannot be discharged laterally but is directed by the combined effect of the shape of the basic groove 320 and the thickness variation of the coating 302 to support the rope in the rope groove 301, lower maximum surface pressures acting on the rope and the coating are also achieved. One method of making a grooved coating 302 like this is to fill the round-bottomed basic groove 320 with coating material and then form a half-round rope groove 301 in this coating material in the basic groove. The shape of the rope grooves is well supported and the load-bearing surface layer under the rope provides a better resistance against lateral propagation of the compression stress produced by the ropes. The lateral spreading or rather adjustment of the coating caused by the pressure is promoted by thickness and elasticity of the coating and reduced by hardness and eventual reinforcements of the coating. The coating thickness on the bottom of the rope groove can be made large, even as large as half the rope thickness, in which case a hard and inelastic coating is needed. On the other hand, if a coating thickness corresponding to only about one tenth of the rope thickness is used, then the coating material may be clearly softer. An elevator for eight persons could be implemented using a coating thickness at the bottom of the groove equal to about one fifth of the rope thickness if the ropes and the rope load are chosen appropriately. The coating thickness should equal at least 2-3 times the depth of the rope surface texture formed by the surface wires of the rope. Such a very thin coating, having a thickness even less than the thickness of the surface wire of the rope, will not necessarily endure the strain imposed on it. In practice, the coating must have a thickness larger than this minimum thickness because the coating will also have to receive rope surface variations rougher than the surface texture. Such a rougher area is formed e.g. where the level differences between rope strands are larger than those between wires. In practice, a suitable minimum coating thickness is about 1-3 times the surface wire thickness. In the case of the ropes normally used in elevators, which have been designed for a contact with a metallic rope groove and which have a thickness of 8-10 mm, this thickness definition leads to a coating at least about 1 mm thick. Since a coating on the traction sheave, which causes more rope wear than the other rope pulleys of the elevator, will reduce rope wear and therefore also the need to provide the rope with thick surface wires, the rope can be made smoother. Rope smoothness can naturally be improved by coating the rope with a material suited for this purpose, such as e.g. polyurethane or equivalent. The use of thin wires allows the rope itself to be made thinner, because thin steel wires can be manufactured from a stronger material than thicker wires. For instance, using 0.2 mm wires, a 4 mm thick elevator hoisting rope of a fairly good construction can be produced. Depending on the thickness of the hoisting rope used and/or on other reasons, the wires in the steel wire rope may preferably have a thickness between 0.15 mm and 0.5 mm, in which range there are readily available steel wires with good strength properties in which even an individual wire has a sufficient wear resistance and a sufficiently low susceptibility to damage. In the above, ropes made of round steel wires have been discussed. Applying the same principles, the ropes can be wholly or partly twisted from non-round profiled wires. In this case, the cross-sectional areas of the wires are preferably substantially the same as for round wires, i.e. in the range of 0.015 $mm^2$-0.2 $mm^2$. Using wires in this thickness range, it will be easy to produce steel wire ropes having a wire strength above about 2000 $N/mm^2$ and a wire cross-section of 0.015 $mm^2$-0.2 $mm^2$ and comprising a large cross-sectional area of steel material in relation to the cross-sectional area of the rope, as is achieved e.g. by using the Warrington construction. For the implementation of the invention, particularly well suited are ropes having a wire strength in the range of 2300 $N/m^2$-2700 $N/mm^2$, because such ropes have a very large bearing capacity in relation to rope thickness while the high hardness of the strong wires involves no substantial difficulties in the use of the rope in elevators. A traction sheave coating well suited for such a rope is already clearly below 1 mm thick. However, the coating should be thick enough to ensure that it will not be very easily scratched away or pierced e.g. by an occasional sand grain or similar particle that may have got between the rope groove and the hoisting rope. Thus, a desirable minimum coating thickness, even when thin-wire hoisting ropes are used, would be about 0.5 . . . 1 mm. For hoisting ropes having small surface wires and an otherwise relatively smooth surface, a coating having a thickness of the form A+Bcosa is well suited. However, such a coating is also applicable to ropes whose surface strands meet the rope groove at a distance from each other, because if the coating material is sufficiently hard, each strand meeting the rope groove is in a way separately supported and the supporting force is the same and/or as desired. In the formula A+Bcosa, A and B are constants so that A+B is the coating thickness at the bottom of the rope groove 301 and the angle a is the angular, distance from the bottom of the rope groove as measured from the center of curvature of the rope groove cross-section. Constant A is larger than or equal to zero, and constant B is always larger than zero. The thickness of the coating growing thinner towards the edges can also be defined in other ways besides using the formula A+Bcosa so that the elasticity decreases towards the edges of the rope groove. The elasticity in the central part of the rope groove can also be increased by making an undercut rope groove and/or by adding to the coating on the bottom of the rope groove a portion of different material of special elasticity, where the elasticity has been increased, in addition to increasing the material thickness, by the use of a material that is softer than the rest of the coating.

Figure 5A:
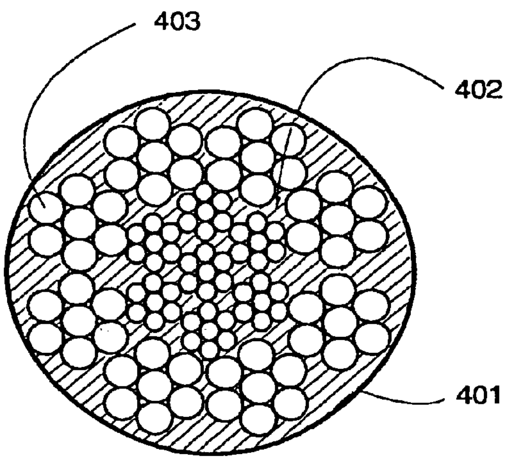
FIG. 5*a* presents a steel wire rope used in the invention.
Figure 5B:
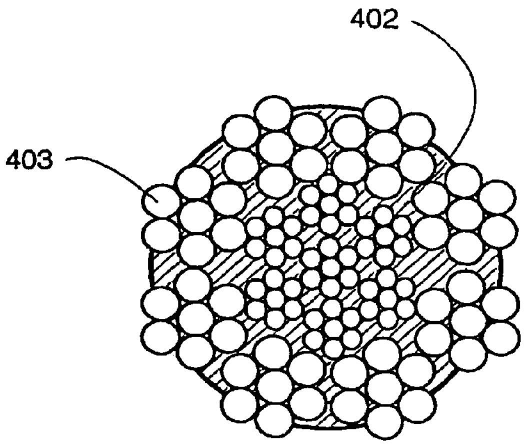
FIG. 5*b* presents another steel wire rope used in the invention.
Figure 5C:
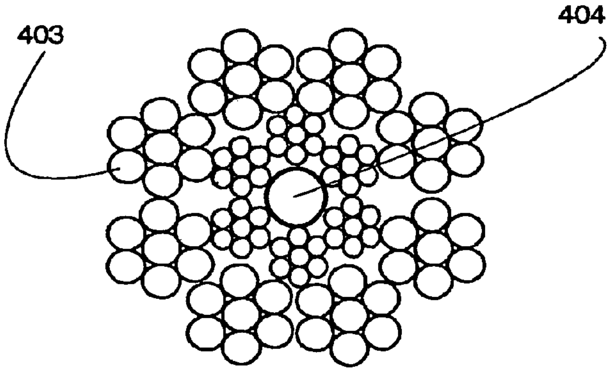
FIG. 5*c* presents a third steel wire rope used in the invention.

FIGS. 5*a*, 5*b* and 5*c* present longitudinal cross-sections of steel wire ropes used in the invention. The ropes in these figures contain thin steel wires 403, a coating 402 on the steel wires and/or partly between the steel wires, and in FIG. 5*a* a coating 401 over the steel wires. The rope presented in FIG. 5*b* is an uncoated steel wire rope with a rubber-like filler added to its interior structure, and FIG. 5*a* presents a steel wire rope provided with a coating in addition to a filler added to the internal structure. The rope presented in FIG. 5*c* has a non-metallic core 404, which may be a solid or fibrous structure made of plastic, natural fiber or some other material suited for the purpose. A, fibrous structure will be good if the rope is lubricated, in which case lubricant will accumulate in the fibrous core. The core thus acts as a kind of lubricant storage. The steel wire ropes of substantially round cross-section used in the elevator of the invention may be coated, uncoated and/or provided with a rubber-like filler, such as e.g. polyurethane or some other suitable filler, added to the interior structure of the rope and acting as a kind of lubricant lubricating the rope and also balancing the pressure between wires and strands. The use of a filler makes it possible to achieve a rope that needs no lubrication, so its surface can be dry. The coating used in the steel wire ropes may be made of the same or nearly the same material as the filler or of a material that is better suited for use as a coating and has properties, such as friction and wear resistance properties, that are better suited to the purpose than a filler. The coating of the steel wire rope may also be so implemented that the coating material penetrates partially into the rope or through the entire thickness of the rope, giving the rope the same properties as the filler mentioned above. The use of thin and strong steel wire ropes according to the invention is possible because the steel wires used are wires of special strength, allowing the ropes to be made substantially thin as compared with steel wire ropes used before. The ropes presented in FIGS. 5*a* and 5*b* are steel wire ropes having a diameter of about 4 mm. For example, when a 2:1 suspension ratio is used, the thin and strong steel wire ropes of the invention preferably have a diameter of about 2.5-5 mm in elevators for a nominal load below 1000 kg, and preferably about 5-8 mm in elevators for a nominal load above 1000 kg. In principle, it is possible to use ropes thinner than this, but in this case a large number of ropes will be needed. Still, by increasing the suspension ratio, ropes thinner than those mentioned above can be used for corresponding loads, and at the same time a smaller and lighter elevator machine can be achieved.

Figure 6:
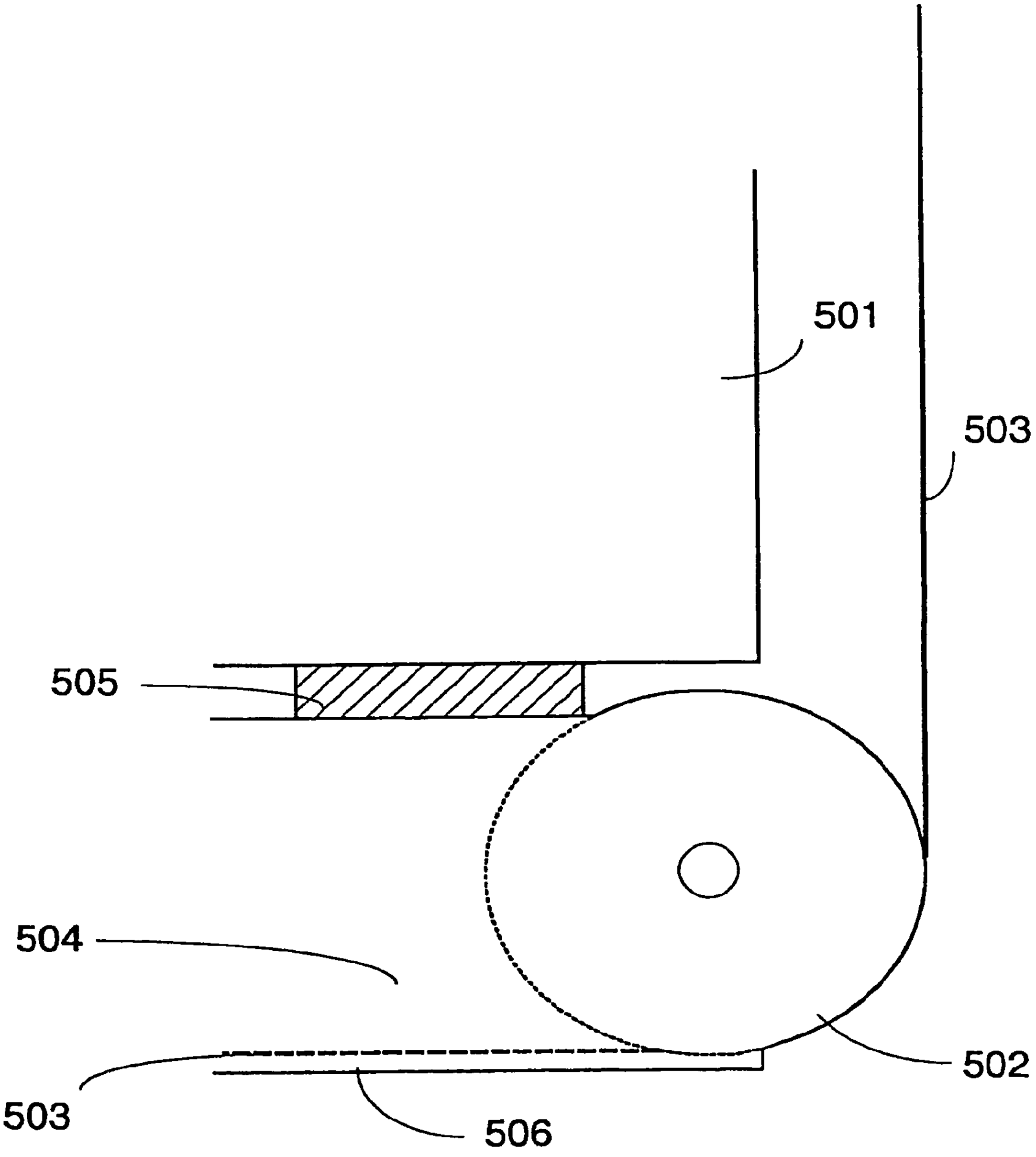
FIG. 6 presents a diagram of a rope pulley placement in an elevator car according to the invention.

FIG. 6 illustrates the manner in which a rope pulley 502 connected to a horizontal beam 504 comprised in the structure supporting the elevator car 501 is placed in relation to the beam 504, said rope pulley being used to support the elevator car and associated structures. The rope pulley 502 presented in the figure may have a diameter equal to or less than the height of the beam 504 comprised in the structure. The beam 504 supporting the elevator car 501 may be located either below or above the elevator car. The rope pulley 502 may be placed completely or partially inside the beam 504, as shown in the figure. The hoisting ropes 503 of the elevator in the figure run as follows: The hoisting ropes 503 come to the coated rope pulley 502 connected to the beam 504 comprised in the structure supporting the elevator car 501, from which pulley the hoisting rope runs further, protected by the beam, e.g. in a hollow 506 inside the beam, under the elevator car and goes then further via a second rope pulley placed on the other side of the elevator car. The elevator car 501 rests on the beam 504 comprised in the structure, on vibration absorbers 505 placed between them. The beam 504 also acts as a rope guard for the hoisting rope 503. The beam 504 may be a C-, U-, I-, Z-section beam or a hollow beam or equivalent.

Figure 7:
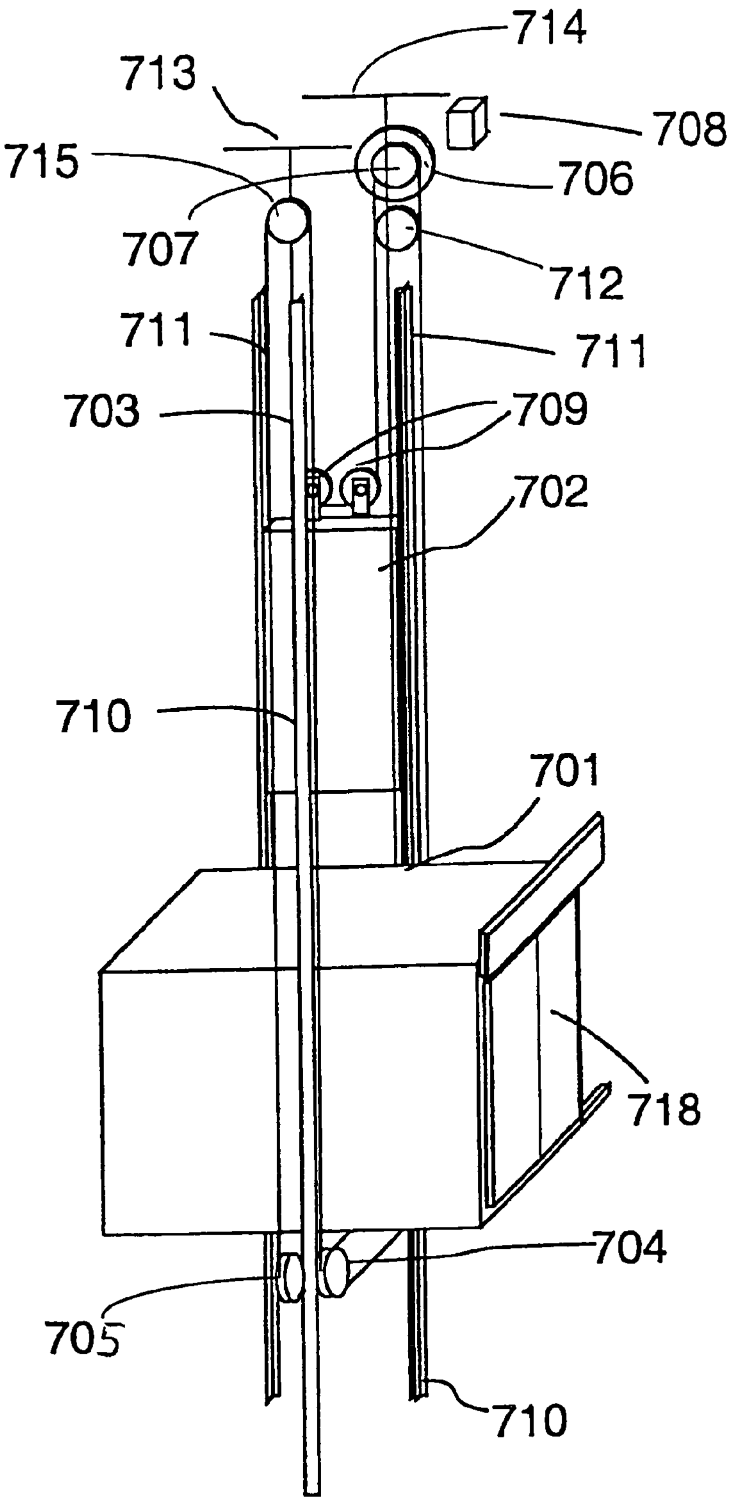
FIG. 7 presents a diagrammatic view of a traction sheave elevator according to the invention.

FIG. 7 presents a diagrammatic illustration of the structure of an elevator according to the invention. The elevator is preferably an elevator without machine room, with a drive machine 706 placed in the elevator shaft. The elevator shown in the figure is a traction sheave elevator with machine above. The passage of the hoisting ropes 703 of the elevator is as follows. One end of the ropes 703 is immovably fixed to an anchorage 713 located in the upper part of the shaft above the path of a counterweight 702 moving along counterweight guide rails 711. From the anchorage 713, the ropes 703 run downwards to diverting, pulleys 709 suspending the counterweight 702, which are rotatably mounted on the counterweight 702 and from which the ropes 703 run further upwards via the rope grooves of diverting pulley 712 to the traction sheave 707 of the drive machine 706, passing around the traction sheave 707 along the rope grooves on the traction sheave 707. From the traction sheave 707, the ropes 703 run further downwards back to diverting pulley 712, wrapping around it along the rope grooves of the diverting pulley 712 and returning then back up to the traction sheave 707, over which the ropes 703 run in the traction sheave rope grooves. From the traction sheave 707, the ropes 703 go further downwards via the rope grooves of the diverting pulley 712 to the elevator car 701 moving along the car guide rails 710 of the elevator, passing under the elevator car 701 via diverting pulleys 704 used to suspend the elevator car 701 on the ropes 703, over diverting pulley 715, again passing under the elevator car 701 via diverting pulleys 705, and going then upwards again from the elevator car 701 to an anchorage 714 in the upper part of the elevator shaft, to which anchorage 714 the second end of the ropes 703 is immovably fixed. Anchorage 713 in the upper part of the shaft, the traction sheave 707, diverting pulley 712, and the diverting pulleys 709 suspending the counterweight 702 on the ropes 703 are preferably so disposed in relation to each other that both the rope portion going from the anchorage 713 to the counterweight 702 and the rope portion going from the counterweight 702 via diverting pulley 712 to the traction sheave 707 are substantially parallel to the path of the counterweight 702. Similarly, a solution is preferred in which the anchorage 714 in the upper part of the shaft, the traction sheave 707, diverting pulleys 715, 712, and the diverting pulleys 704, 705 suspending the elevator car 701 on the ropes 703 are so disposed in relation to each other that the rope portion going from the anchorage 714 to the elevator car 701 and the rope portion going from the elevator car 701 via diverting pulley 712 to the traction sheave 707 are substantially parallel to the path of the elevator car 701. With this arrangement, no additional diverting pulleys are needed to define the passage of the ropes 703 in the shaft. The roping arrangement between the traction sheave 707 and the diverting pulley 712 is referred to as Double Wrap ("DW") roping, wherein the hoisting ropes 703 are wrapped around the traction sheave 707 two and/or more times. In this way, the contact angle can be increased in two and/or more stages. For example, in the embodiment presented in FIG. 7, a contact angle of 180°+180° (i.e., 360°) between the traction sheave 707 and the hoisting ropes 703 is achieved. The rope suspension acts in a substantially centric manner on the elevator car 701, provided that the rope pulleys 704, 705 suspending the elevator car 701 are mounted substantially symmetrically relative to the vertical center line passing via the center of gravity of the elevator car 701. A preferable solution is to dispose the traction sheave 707 and the diverting pulley 712 in such a way that the diverting pulley 712 will also function as a guide of the hoisting ropes 703 and as a damping pulley.

The drive machine 706 placed in the elevator shaft is preferably of flat construction, in other words, the drive machine 706 has a small thickness dimension as compared with its width and/or height, or at least the drive machine 706 is slim enough to be accommodated between the elevator car 701 and a wall of the elevator shaft. The drive machine 706 may also be placed differently, e.g., by disposing the slim machine 706 partly or completely between an imaginary extension of the elevator car 701 and a shaft wall. The elevator shaft is advantageously provided with equipment required for the supply of power to the motor driving the traction sheave 707 as well as equipment needed for elevator control, both of which can be placed in a common instrument panel 708 or mounted separately from each other or integrated partly or wholly with the drive machine 706. The drive machine 706 may be of geared or gearless type. A preferable solution is a gearless machine comprising a permanent magnet motor. Another advantageous solution is to build a complete unit comprising both the elevator drive machine 706 and the diverting pulley 712 and its bearings, which is used to increase the contact angle, in a correct operating angle relative to the traction sheave 707, which unit can be mounted in place as a unitary aggregate in the same way as a drive machine 706. The drive machine 706 may be fixed to a wall of the elevator shaft, to the ceiling, to a guide rail or guide rails or to some other structure, such as a beam or frame. The diverting pulley/diverting pulleys to be placed near the drive machine 706 to increase the operating angle can be mounted in the same way. In the case of an elevator with machine below, a further possibility is to mount the above-mentioned components on the bottom of the elevator shaft. In DW roping, when diverting pulley 712 is of substantially equal size with the traction sheave 707, diverting pulley 712 can also function as a damping wheel. In this case, the ropes 703 going from the traction sheave 707 to the counterweight 702 and to the elevator car 701 are passed via the rope grooves of the diverting pulley 712 and the rope deflection caused by the diverting pulley 712 is very small. It could be said that the ropes 703 coming from the traction sheave only touch the diverting pulley 712 tangentially. Such tangential contact serves as a solution damping the vibrations of outgoing ropes 703 and it can applied in other roping solutions as well. An example of these other roping solutions is Single Wrap ("SW") roping, where the diverting pulley is of substantially equal size with the traction sheave 707 of the drive machine 706 and where a diverting pulley 712 is used for tangential rope contact as described above. In SW roping according to the example, the ropes 703 wrap around the traction sheave 707 only once, with a contact angle of about 180° between the rope 703 and the traction sheave 707, the diverting pulley 712 is only used as a means of producing a tangential contact as described above and the diverting pulley 712 functions as a rope guide and as a damping wheel for the damping of vibrations. The suspension ratio of the elevator is of no importance with respect to the application of SW roping described in the example; instead, it can be used in connection with any suspension ratio. The embodiment using SW roping as described in the example may have an inventive value in itself, at least in regard of damping. The diverting pulley 712 may also be of substantially different size than the traction sheave 707, in which case it functions as a diverting pulley 712 increasing the contact angle and not as a damping wheel. FIG. 7 presents an elevator according to the invention that uses a suspension ratio of 4:1. The invention can also be implemented using other suspension arrangements. For example, an elevator according to the invention can be implemented using a suspension ratio of 1:1, 2:1, 3:1, or even suspension ratios higher than 4:1. The elevator presented in the figure has automatic telescoping doors 718, but other types of automatic doors or turning doors may also be used within the framework of the invention.

Figure 8:
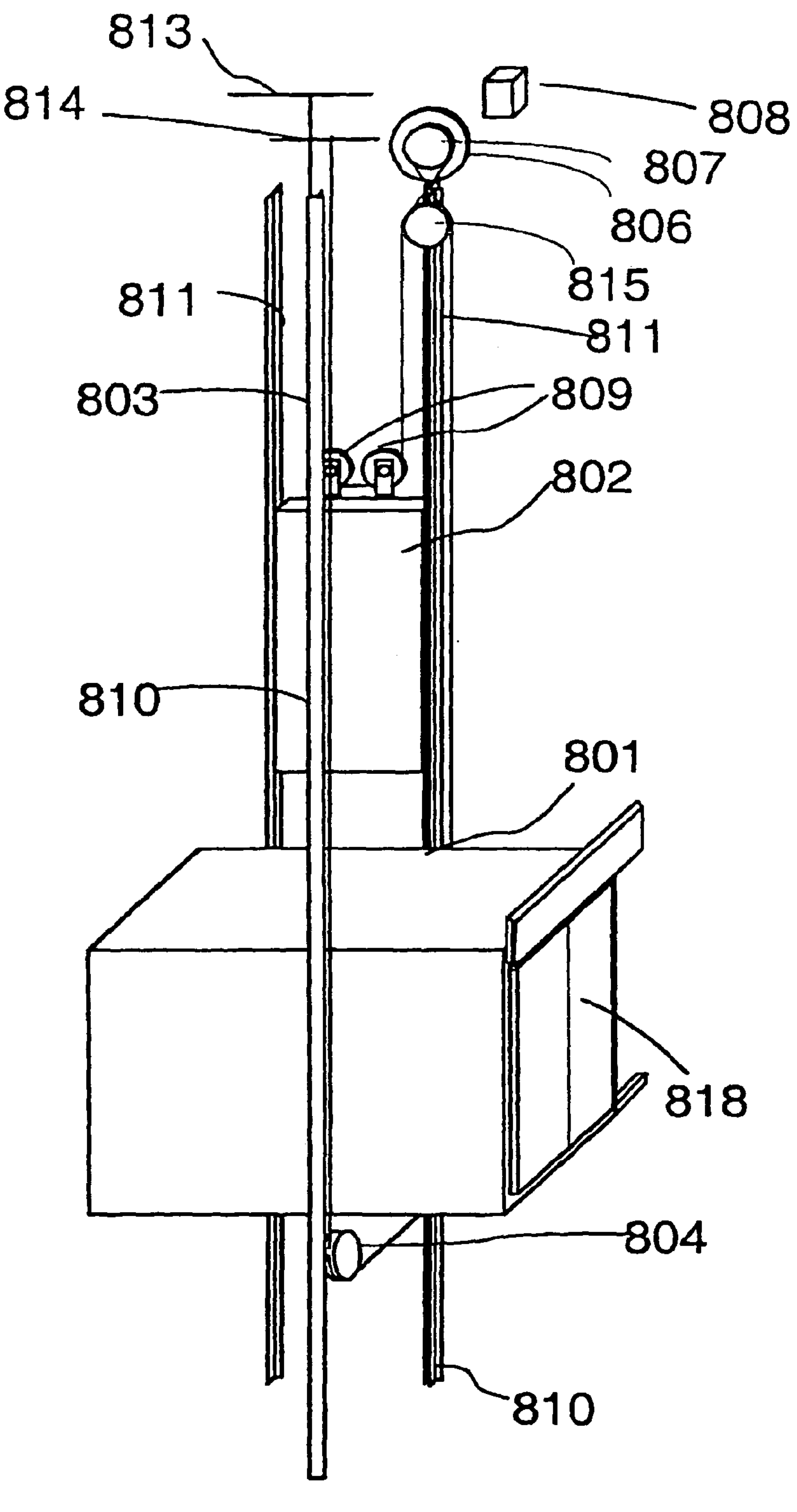
FIG. 8 presents a diagrammatic view of a traction sheave elevator according to the invention.

FIG. 8 presents a diagrammatic illustration of the structure of an elevator according to the invention. The elevator is preferably an elevator without machine room, with a drive machine 806 placed in the elevator shaft. The elevator shown in the figure is a traction sheave elevator with machine above. The passage of the hoisting ropes 803 of the elevator is as follows: One end of the ropes is immovably fixed to an anchorage 813 located in the upper part of the shaft above the path of a counterweight 802 moving along counterweight guide rails 811. From the anchorage, the ropes run downwards to diverting pulleys 809 suspending the counterweight, which are rotatably mounted on the counterweight 802 and from which the ropes 803 run further upward via the rope grooves of diverting pulley 815 to the traction sheave 807 of the drive machine 806, wrapping around the traction sheave along the rope grooves on the sheave. From the traction sheave 807, the ropes 803 run further downwards, going crosswise relative to the upwards going ropes, and further via the rope grooves of the diverting pulley to the elevator car 801 moving along the car guide rails 810 of the elevator, passing under the car via diverting pulleys 804 used to suspend the elevator car on the ropes, and going then upwards again from the elevator car to an anchorage 814 in the upper part of the elevator shaft, to which anchorage the second end of the ropes 803 is immovably fixed. Anchorage 813 in the upper part of the shaft, the traction sheave 807, diverting pulley 815 and the diverting pulley 809 suspending the counterweight on the ropes are preferably so disposed in relation to each other that both the rope portion going from the anchorage 813 to the counterweight 802 and the rope portion going from the counterweight 802 via diverting pulley 815 to the traction sheave 807 are substantially parallel to the path of the counterweight 802. Similarly, a solution is preferred in which the anchorage 814 in the upper part of the shaft, the traction sheave 807, diverting pulley 815 and the diverting pulleys 804 suspending the elevator car on the ropes are so disposed in relation to each other that the rope portion going from the anchorage 814 to the elevator car 801 and the rope portion going from the elevator car 801 via diverting pulley 815 to the traction sheave 807 are substantially parallel to the path of the elevator car 801. With this arrangement, no additional diverting pulleys are needed to define the passage of the ropes in the shaft. This roping arrangement between the traction sheave 807 and the diverting pulley 815 can be referred to as X Wrap (XW) roping, while Double Wrap (DW) roping, Single Wrap (SW) roping and Extended Wrap (ESW) roping are previously known concepts. In X Wrap roping, the ropes are ca-used to wrap around the traction sheave with a large contact angle. For example, in the case illustrated in FIG. 8, a contact angle of well over 180°, i.e. about 270° between the traction sheave 807 and the hoisting ropes 803 is achieved. X Wrap roping presented in the figure can also be arranged in another way, e.g. by providing two diverting pulleys at appropriate positions near the drive machine. Diverting pulley 815 has been fitted in a position designed to form an angle relative to the traction sheave 807 such that the ropes will run crosswise in a manner known in itself so that the ropes are not damaged. The rope suspension acts in a substantially centric manner on the elevator car 801, provided that the rope pulleys 804 suspending the elevator car are mounted substantially symmetrically relative to the vertical center line passing via the center of gravity of the elevator car 801.

The drive machine 806 placed in the elevator shaft is preferably of flat construction, in other words, the machine has a small thickness dimension as compared with its width and/or height, or at least the machine is slim enough to be accommodated between the elevator car and a wall of the elevator shaft. The machine may also be placed differently, e.g. by disposing the slim machine partly or completely between an imaginary extension of the elevator car and a shaft wall. The elevator shaft is advantageously provided with equipment required for the supply of power to the motor driving the traction sheave 807 as well as equipment needed for elevator control, both of which can be placed in a common instrument panel 808 or mounted separately from each other or integrated partly or wholly with the drive machine 806. The drive machine may be of geared or gearless type. A preferable solution is a gearless machine comprising a permanent magnet motor. Another advantageous solution is to build a complete unit comprising both the elevator drive machine 806 and the diverting pulley 815 and its bearings, which is used to increase the contact angle, in a correct operating angle relative to the traction sheave 807, which unit can be mounted in place as a unitary aggregate in the same way as a drive machine. Using a complete unit means less need for rigging during installation. X Wrap roping can also be implemented by mounting a diverting pulley directly on the drive machine. The drive machine may be fixed to a wall of the elevator shaft, to the ceiling, to a guide rail or guide rails or to some other structure, such as a beam or frame. The diverting pulley to be placed near the drive machine to increase the operating angle can be mounted in the same way. In the case of an elevator with machine below, a further possibility is to mount the above-mentioned components on the bottom of the elevator shaft. FIG. 8 illustrates the economical 2:1 suspension, but the invention can also be implemented in an elevator with 1:1 suspension ratio, in other words, in an elevator with the hoisting ropes connected directly to the counterweight and elevator car without a diverting pulley. The invention can also be implemented using other suspension arrangements. For example, an elevator according to the invention can be implemented using a suspension ratio of 3:1, 4:1 or even higher suspension ratios. The elevator presented in the figure has automatic telescoping doors, but other types of automatic doors or turning doors may also be used within the framework of the invention.

Figure 9:
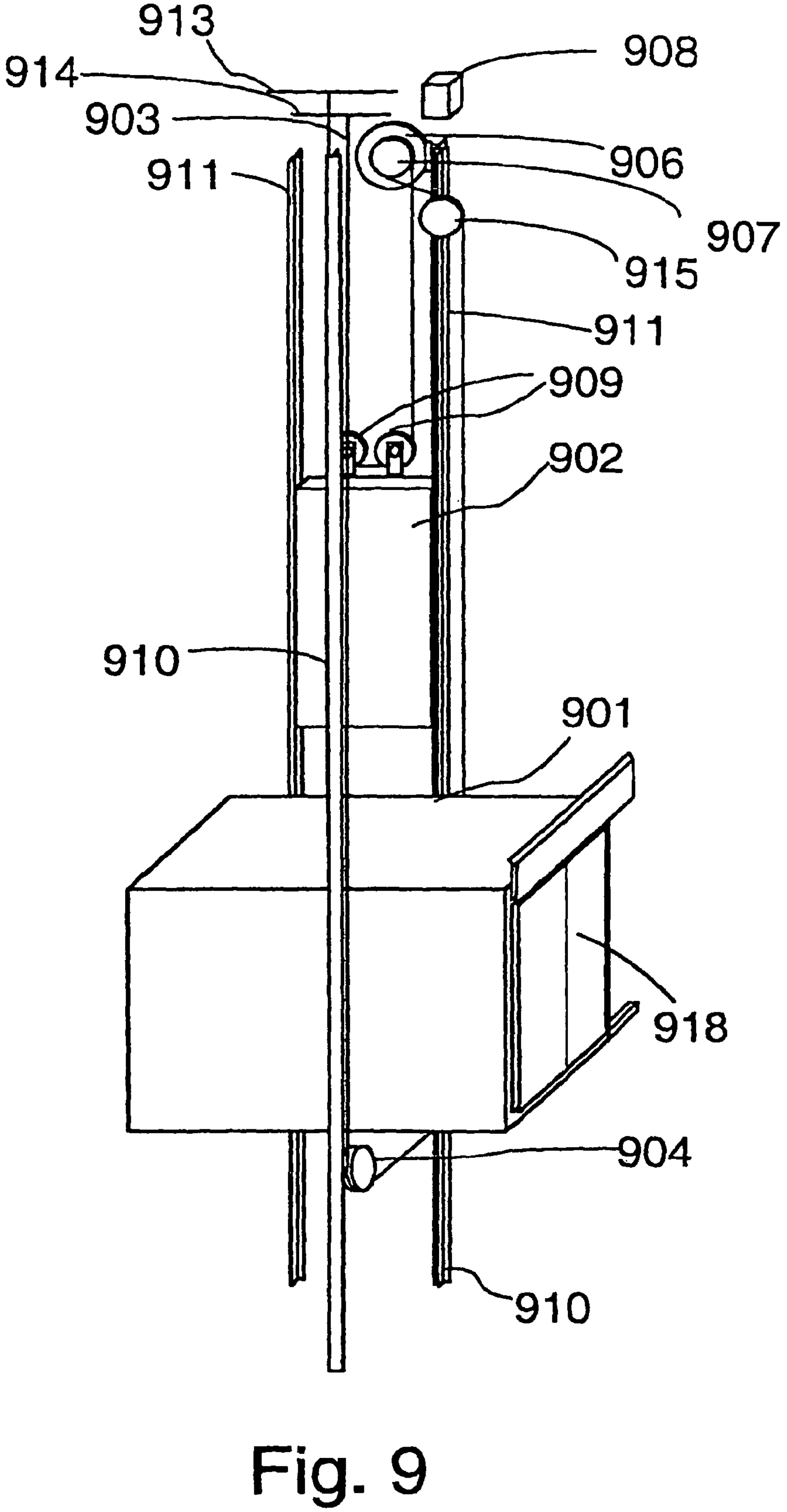
FIG. 9 presents a diagrammatic view of a traction sheave elevator according to the invention, FIG. 10 present traction sheave roping solutions according to the invention.

FIG. 9 presents a diagrammatic illustration of the structure of an elevator according to the invention. The elevator is preferably an elevator without machine room, with a drive machine 906 placed in the elevator shaft. The elevator shown in the figure is a traction sheave elevator with machine above. The passage of the hoisting ropes 903 of the elevator is as follows: One end of the ropes is immovably fixed to an anchorage 913 located in the upper part of the shaft above the path of a counterweight 902 moving along counterweight guide rails 911. From the anchorage, the ropes run downwards to diverting pulleys 909 suspending the counterweight, which are rotatably mounted on the counterweight 902 and from which diverting pulleys 909 the ropes 903 run further upward to the traction sheave 907 of the drive machine 906, wrapping around the traction sheave along the rope grooves on the sheave. From the traction sheave 907, the ropes 903 run further downwards, going crosswise relative to the upwards going ropes, and further to diverting pulley 915, wrapping around it along the rope grooves of the diverting pulley 915. From the diverting pulley 915, the ropes go further downwards to the elevator car 901 moving along the car guide rails 910 of the elevator, passing under the car via diverting pulleys 904 used to suspend the elevator car on the ropes, and going then upwards again from the elevator car to an anchorage 914 in the upper part of the elevator shaft, to which anchorage the second end of the ropes 903 is immovably fixed. Anchorage 913 in the upper part of the shaft, the traction sheave 907 and the diverting pulley 909 suspending the counterweight on the ropes are preferably so disposed in relation to each other that both the rope portion going from the anchorage 913 to the counterweight 902 and the rope portion going from the counterweight 902 to the traction sheave 907 are substantially parallel to the path of the counterweight 902. Similarly, a solution is preferred in which the anchorage 914 in the upper part of the shaft, the traction sheave 907, diverting pulley 915 and the diverting pulleys 904 suspending the elevator car on the ropes are so disposed in relation to each other that the rope portion going from the anchorage 914 to the elevator car 901 and the rope portion going from the elevator car 901 via diverting pulley 915 to the traction sheave 907 are substantially parallel to the path of the elevator car 901. With this arrangement, no additional diverting pulleys are needed to define the passage of the ropes in the shaft. This roping arrangement between the traction sheave 907 and the diverting pulley 915 can be referred to as Extended Single Wrap roping. In Extended Single Wrap roping, by using a diverting pulley, the hoisting ropes are caused to wrap around the traction sheave with a larger contact angle. For example, in the case illustrated in FIG. 9, a contact angle of well over 180°, i.e. about 270° between the traction sheave 907 and the hoisting ropes 903 is achieved. Extended Single Wrap roping presented in the figure can also be arranged in another way, e.g. by disposing the drive machine and the diverting pulley in another way in relation to each other, e.g. the other way round relative to each other than in the case presented in FIG. 9. Diverting pulley 915 has been fitted in a position designed to form an angle relative to the traction sheave 907 such that the ropes will run crosswise in a manner known in itself so that the ropes are not damaged. The rope suspension acts in a substantially centric manner on the elevator car 901, provided that the rope pulleys 904 suspending the elevator car are mounted substantially symmetrically relative to the vertical center line passing via the center of gravity of the elevator car 901. In the solution represented by FIG. 9, the drive machine 906 can preferably be placed e.g. in the free space above the counterweight, thereby increasing the space saving potential of the elevator. The drive machine 906 placed in the elevator shaft is preferably of flat construction, in other words, the machine has a small thickness dimension as compared with its width and/or height, or at least the machine is slim enough to be accommodated between the elevator car and a wall of the elevator shaft. The machine may also be placed differently, e.g. by disposing the slim machine partly or completely between an imaginary extension of the elevator car and a shaft wall. The elevator shaft is advantageously provided with equipment required for the supply of power to the motor driving the traction sheave 907 as well as equipment needed for elevator control, both of which can be placed in a common instrument panel 908 or mounted separately from each other or integrated partly or wholly with the drive machine 906. The drive machine may be of geared or gearless type. A preferable solution is a gearless machine comprising a permanent magnet motor. Another advantageous solution is to build a complete unit comprising both the elevator drive machine 906 and/or the diverting pulley/diverting pulleys 915 with their bearings, mounted in a correct operating angle relative to the traction sheave 907 to increase the contact angle, all this equipment being ready fitted on a mounting base, which unit can be mounted in place as a unitary aggregate in the same way as a drive machine. Using a unitary aggregate solution reduces the need for rigging at installation time. The drive machine may be fixed to a wall of the elevator shaft, to the ceiling, to a guide rail or guide rails or to some other structure, such as a beam or frame. The diverting pulley to be placed near the drive machine to increase the operating angle can be mounted in the same way. In the case of an elevator with machine below, a further possibility is to mount the above-mentioned components on the bottom of the elevator shaft. FIG. 9 illustrates the economical 2:1 suspension, but the invention can also be implemented in an elevator with 1:1 suspension ratio, in other words, in an elevator with the hoisting ropes connected directly to the counterweight and elevator car without a diverting pulley. The invention can also be implemented using other suspension arrangements. For example, an elevator according to the invention can be implemented using a suspension ratio of 3:1, 4:1 or even higher suspension ratios. The elevator presented in the figure has automatic telescoping doors, but other types of automatic doors or turning doors may also be used within the framework of the invention.

FIGS. 10*a*, 10*b*, 10*c*, 10*d*, 10*e*, 10*f* and 10*g* present some variations of the roping arrangements according to the invention that can be used between the traction sheave 1007 and the diverting pulley 1015 to increase the contact angle between the ropes 1003 and the traction sheave 1007, in which arrangements the ropes 1003 go downwards from the drive machine 1006 towards the elevator car and counterweight. These roping arrangements make it possible to increase the contact angle between the hoisting rope 1003 and the traction sheave 1007. In the invention, contact angle $\alpha$ refers to the length of the arc of contact between the traction sheave and the hoisting rope. The magnitude of the contact angle $\alpha$ may be expressed e.g. in degrees, as is done in the invention, but it is also possible to express the magnitude of the contact angle in other terms, e.g. in radians or equivalent. The contact angle $\alpha$ is presented in greater detail in FIG. 10*a*. In the other figures, the contact angle $\alpha$ is not expressly indicated, but it can be seen from the other figures as well without specific description.

Figure 10A:
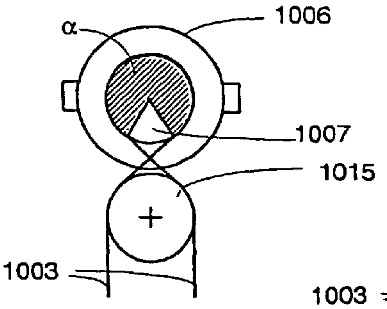
Figure 10B:
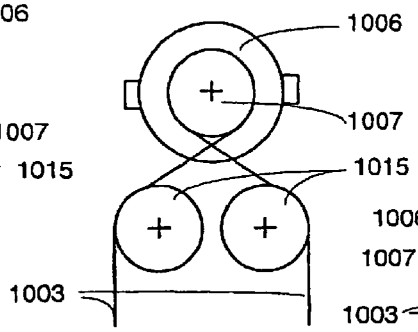
Figure 10C:
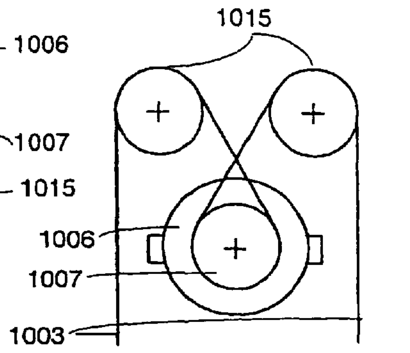

The roping arrangements presented in FIG. 10*a*, 10*b*, 10*c* represent some variations of the X Wrap roping described above. In the arrangement presented in FIG. 10*a*, the ropes 1003 come via diverting pulley 1015, wrapping around it along rope grooves, to the traction sheave 1007, over which the ropes pass along its rope grooves and then go further back to the diverting pulley 1015, passing crosswise with respect to the rope portion coming from the diverting pulley, and continuing their passage further. Crosswise passage of the ropes 1003 between the diverting pulley 1015 and the traction sheave 1007 can be implemented e.g. by having the diverting pulley fitted at such an angle with respect to the traction sheave that the ropes will cross each other in a manner known in itself so that the ropes 1003 are not damaged. In FIG. 10*a*, the contact angle $\alpha$ between the ropes 1003 and the traction sheave 1007 is represented by the shaded area. The magnitude of the contact angle $\alpha$ in this figure is about 310°. The size of the diameter of the diverting pulley can be used as a means of determining the distance of suspension that is to be provided between the diverting pulley 1015 and the traction sheave 1007. The magnitude of the contact angle can be varied by varying the distance between the diverting pulley 1015 and the traction sheave 1007. The magnitude of the angle $\alpha$ can also be varied by varying the diameter of the diverting pulley and/or by varying the diameter of the traction sheave and also by varying the relation between the diameters of the diverting pulley and the traction sheave. FIGS. 10*b* and 10*c* present an example of implementing a corresponding XW roping arrangement using two diverting pulleys.

Figure 10D:
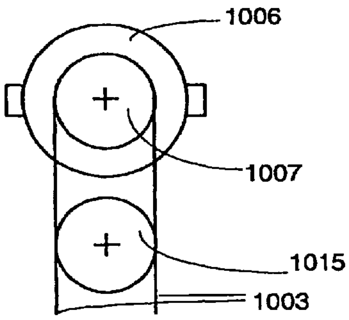
Figure 10E:
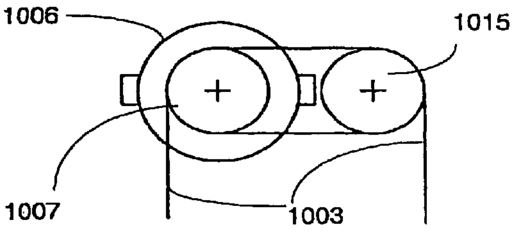

The roping arrangements presented in FIGS. 10*d* and 10*e* are different variations of the above-mentioned Double Wrap roping. In the roping arrangement in FIG. 10*d*, the ropes run via the rope grooves of diverting pulley 1015 to the traction sheave traction sheave 1007 of the drive machine 1006, passing over it along the rope grooves of the traction sheave. From the traction sheave 1007, the ropes 1003 go further downwards back to diverting pulley 1015, wrapping around it along the rope grooves of the diverting pulley and returning then back to the traction sheave 1007, over which the ropes run in the rope grooves of the traction sheave. From the traction sheave 1007, the ropes 1003 run further downwards via the rope grooves of the diverting pulley. In the roping arrangement presented in the figure, the hoisting ropes are caused to wrap around the traction sheave twice and/or more times. By these means, the contact angle can be increased in two and/or more stages. For example, in the case presented in FIG. 10*d*, a contact angle of 180°+180° between the traction sheave 1007 and the ropes 1003 is achieved. In Double Wrap roping, when the diverting pulley 1015 is substantially of equal size with the traction sheave 1007, the diverting pulley 1015 also functions as a damping wheel. In this case, the ropes going from the traction sheave 1007 to the counterweight and elevator car pass via the rope grooves of the diverting pulley 1015 and the rope deflection produced by the diverting pulley is very small. It could be said that the ropes coming from the traction sheave only touch the diverting pulley tangentially. Such tangential contact serves as a solution damping the vibrations of outgoing ropes and it can applied in other roping arrangements as well. In this case, the diverting pulley 1015 also functions as a rope guide. The ratio of the diameters of the diverting pulley and traction sheave can be varied by varying the diameters of the diverting pulley and/or traction sheave. This can be used as a means of defining the magnitude of the contact angle and fitting it to a desired magnitude. By using DW roping, forward bending of the rope 1003 is achieved, which means that the rope 1003 is in DW roping is bent in the same direction on the diverting pulley 1015 and on the traction sheave 1007. DW roping can also be implemented in other ways, such as e.g. the way illustrated in FIG. 10*e*, where the diverting pulley 1015 is disposed on the side of the traction sheave 1007. In this roping arrangement, the ropes 1003 are passed in a manner corresponding to FIG. 10*d*, but in this case a contact angle of 180°+90°, i.e. 270° is obtained. If the diverting pulley 1015 is placed on the side of the traction sheave in the case of DW roping, greater demands are imposed on the bearings and mounting of the diverting pulley because it is exposed to greater stress and load forces than in the embodiment presented in FIG. 10*d.*

Figure 10F:
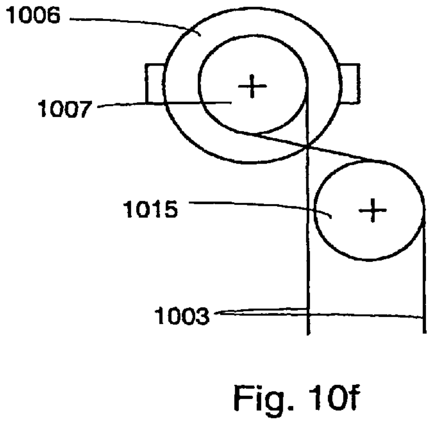
Figure 10G:
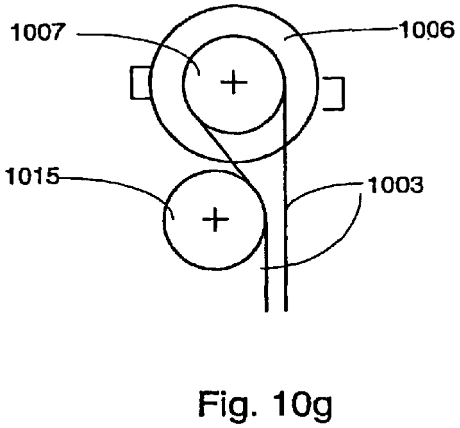

FIG. 10*f* presents an embodiment of the invention applying Extended Single Wrap roping as mentioned above. In the roping arrangement presented in the figure, the ropes 1003 run to the traction sheave 1007 of the drive machine 1006, wrapping around it along the rope grooves of the traction sheave. From the traction sheave 1007, the ropes 1003 go further downwards, running crosswise relative to the upwards going ropes and further to diverting pulley 1015, passing over it along the rope grooves of the diverting pulley 1015. From the diverting pulley 1015, the ropes 1003 run further on. In Extended Single Wrap roping, by using a diverting pulley, the hoisting ropes are caused to wrap around the traction sheave with a larger contact angle than in ordinary Single Wrap roping. For example, in the case illustrated in FIG. 10*f*, a contact angle of about 270° between the ropes 1003 and the traction sheave 1007 is obtained. The diverting pulley 1015 is fitted in position at an angle such that the ropes run cross-wise in a manner known in itself, so that the ropes are not damaged. By virtue of the contact angle achieved using Extended Single Wrap roping, elevators implemented according to the invention can use a very light elevator car and the elevator drive machine can be placed e.g. in the free space above the counterweight, thus allowing freer disposition of other elevator components because there is more space available. One possibility of increasing the contact angle is illustrated in FIG. 10*g*, where the hoisting ropes do not run crosswise relative to each other after wrapping around the traction sheave and/or diverting pulley. By using a roping arrangement like this, it is also possible increase the contact angle between the hoisting ropes 1003 and the traction sheave 1007 of the drive machine 1006 to a magnitude substantially over 180°.

FIGS. 10*a,b,c,d,f* and *g* present different variations of roping arrangements between the traction sheave and the diverting pulley/diverting pulleys, in which the ropes go downwards from the drive machine towards the counterweight and the elevator car. In the case of an elevator embodiment according to the invention with machine below, these roping arrangements can be inverted and implemented in a corresponding manner so that the ropes go upwards from the elevator drive machine towards the counterweight and the elevator car.

Figure 11:
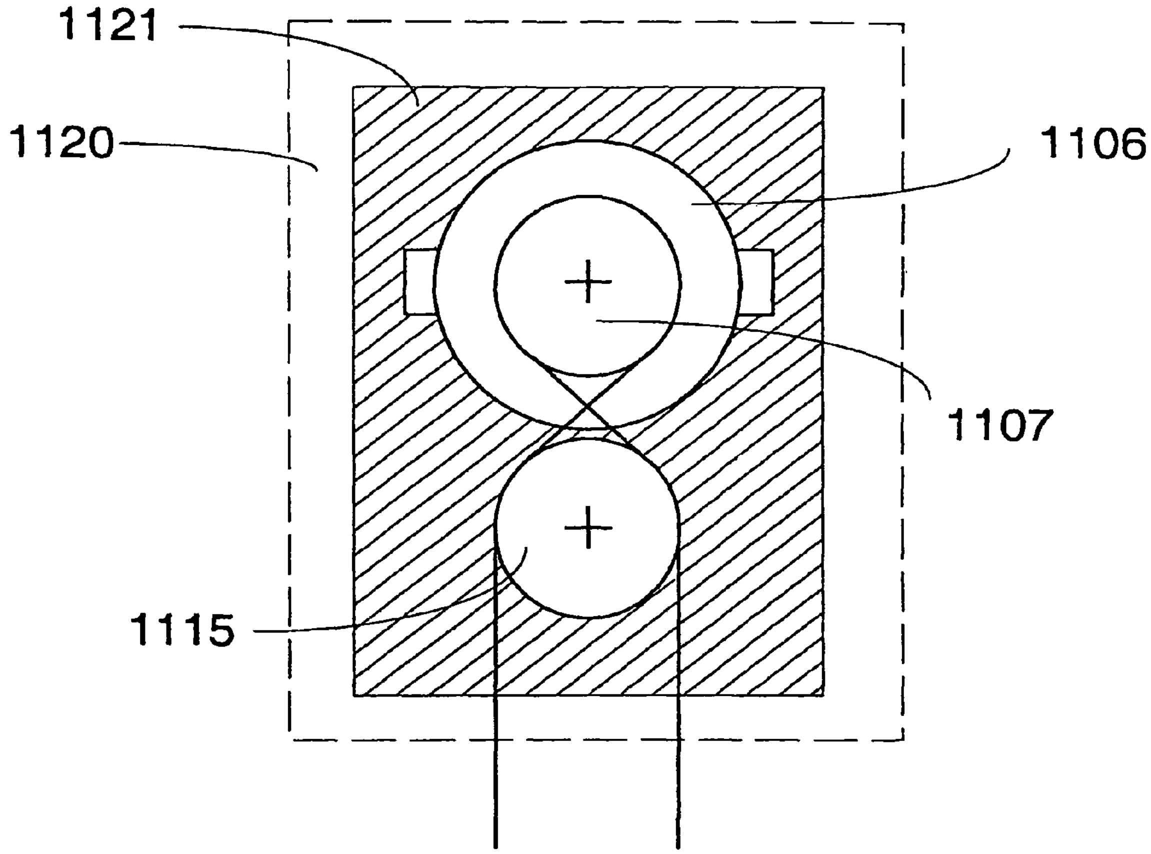
FIG. 11 presents an embodiment according to the invention.

FIG. 11 presents yet another embodiment of the invention, wherein the elevator drive machine 1106 is fitted together with a diverting pulley 1115 on the same mounting base 1121 in a ready-made unit 1120, which can be fitted as such to form a part of an elevator according to the invention. The unit contains the elevator drive machine 1106, the traction sheave 1107 and diverting pulley 1115 ready-fitted on the mounting base 1121, the traction sheave and diverting pulley being ready fitted at a correct operating angle relative to each other, depending on the roping arrangement used between the traction sheave 1107 and the diverting pulley 1115. The unit 1120 may comprise more than only one diverting pulley 1115, or it may only comprise the drive machine 1106 fitted on the mounting base 1121. The unit can be mounted in an elevator according to the invention like a drive machine, the mounting arrangement being described in greater detail in connection with the previous figures. If necessary, the unit can be used together with any of the roping arrangements described above, such as e.g. embodiments using ESW, DW, SW or XW roping. By fitting the above-described unit as part of an elevator according to the invention, considerable savings can be made in installation costs and in the time required for installation.

It is obvious to the person skilled in the art that different embodiments of the invention are not limited to the examples described above, but that they may be varied within the scope of the following claims. For instance, the number of times the hoisting ropes are passed between the upper part of the elevator shaft and the counterweight or elevator car is not a very decisive question as regards the basic advantages of the invention, although it is possible to achieve some additional advantages by using multiple rope passages. In general, embodiments should be so implemented that the ropes go to the elevator car at most as many times as to the counterweight. It is also obvious that the hoisting ropes need not necessarily be passed under the car; instead, they may also be passed over or sideways past the elevator car. In accordance with the examples described above, the skilled person can vary the embodiment of the invention, while the traction sheaves and rope pulleys, instead of being coated metal pulleys, may also be uncoated metal pulleys or uncoated pulleys made of some other material suited to the purpose.

It is further obvious to the person skilled in the art that the metallic traction sheaves and rope pulleys used in the invention, which are coated with a non-metallic material at least in the area of their grooves, may be implemented using a coating material consisting of e.g. rubber, polyurethane or some other material suited to the purpose.

It is also obvious to the person skilled in the art that the elevator car, the counterweight and the machine unit may be laid out in the cross-section of the elevator shaft in a manner differing from the lay-out described in the examples. Such a different lay-out might be e.g. one in which the machine and the counterweight are located behind the car as seen from the shaft door and the ropes are passed under the car diagonally relative to the bottom of the car. Passing the ropes under the car in a diagonal or otherwise oblique direction relative to the form of the bottom provides an advantage when the suspension of the car on the ropes is to be made symmetrical relative to the center of mass of the elevator in other types of suspension lay-out as well.

It is further obvious to the person skilled in the art that the equipment required for the supply of power to the motor and the equipment needed for elevator control can be placed elsewhere than in connection with the machine unit, e.g. in a separate instrument panel. It is also possible to fit pieces of equipment needed for control into separate units which can then be disposed in different places in the elevator shaft and/or in other parts of the building. It is likewise obvious to the skilled person that an elevator applying the invention may be equipped differently from the examples described above. It is further obvious to the skilled person that the suspension solutions according to the invention can also be implemented using some other type of flexible hoisting means as hoisting ropes than the means described here, to achieve small deflection diameters of the hoisting means, for example by using flexible rope of one or more strands, flat belt, cogged belt, trapezoidal belt or some other type of belt applicable to the purpose, or even using different types of chains.

It is also obvious to the skilled person that, instead of using ropes with a filler as illustrated in FIGS. 5*a* and 5*b*, the invention may be implemented using ropes without filler, which are either lubricated or unlubricated. In addition, it is also obvious to the person skilled in the art that the ropes may be twisted in many different ways. It is also obvious to the skilled person that the average of the wire thicknesses may be understood as referring to a statistical, geometrical or arithmetical mean value. To determine a statistical average, the standard deviation or Gauss distribution can be used. It is further obvious that the wire thicknesses in the rope may vary, e.g. even by a factor of 3 or more.

It is also obvious to the person skilled in the art that the elevator of the invention can be implemented using different roping arrangements for increasing the contact angle α between the traction sheave and the diverting pulley/diverting pulleys than those described as examples. For example, it is possible to dispose the diverting pulley/diverting pulleys, the traction sheave and the hoisting ropes in other ways than in the roping arrangements described in the examples.

What is claimed is:

1. An elevator, comprising:

a set of hoisting ropes supporting a counterweight and an elevator car moving on respective tracks, each hoisting rope having a substantially round cross-section; and a hoisting machine engaging the set of hoisting ropes via a traction sheave;

wherein the traction sheave has a plurality of rope grooves, wherein each of the plurality of rope grooves generally conforms to a substantially circular shape, wherein each of the plurality of rope grooves has an opening for receiving a hoisting rope from among the set of hoisting ropes, wherein a width of the opening is less than a diameter of a respective rope groove, wherein a coating is adhesively bonded to each of the plurality of rope grooves, wherein in each rope groove, the coating has a crescent-shaped cross-section, wherein each hoisting rope has a diameter below 8 mm, wherein each hoisting rope is composed of steel wires having a strength exceeding 2000 N/mm$^2$, and wherein a contact angle between the set of hoisting ropes and the traction sheave is greater than about 180 degrees.

2. The elevator of claim 1, wherein there is a continuous contact angle of greater than about 180 degrees between the traction sheave and the set of hoisting ropes.

3. The elevator of claim 1, wherein the contact angle on the traction sheave includes 2 or more parts.

4. The elevator of claim 1, wherein the traction sheave is roped using one of extended wrap roping, double wrap roping, and X wrap roping.

5. The elevator of claim 1, wherein the counterweight is suspended with a suspension ratio of n:1, wherein the elevator car is suspended with a suspension ratio of m:1, wherein m is an integer greater than or equal to 1, and wherein n is an integer greater than or equal to m.

6. The elevator of claim 1, further comprising:

an overspeed governor having a rope with a diameter that is greater than or equal to the diameter of each hoisting rope.

7. The elevator of claim 1, wherein the counterweight is suspended with a suspension ratio of n:1, wherein the elevator car is suspended with a suspension ratio of m:1, wherein m is an integer greater than 1, and wherein n is an integer greater than or equal to m.

8. The elevator of claim 1, wherein the counterweight is suspended with a suspension ratio of n:1, wherein the elevator car is suspended with a suspension ratio of m:1, wherein m is an integer greater than or equal to 1, and wherein n is an integer greater than m.

9. The elevator of claim 1, wherein the counterweight is suspended with a suspension ratio of m:1, wherein the elevator car is suspended with a suspension ratio of m:1, and wherein m is an integer greater than or equal to 1.

10. The elevator of claim 1, wherein the counterweight is suspended with a suspension ratio of m:1, wherein the elevator car is suspended with a suspension ratio of m:1, and wherein m is an integer greater than 1.

11. An elevator, comprising:

a set of hoisting ropes supporting a counterweight and an elevator car moving on respective tracks, each hoisting rope having a substantially round cross-section; and a hoisting machine engaging the set of hoisting ropes via a traction sheave;

wherein the traction sheave has a plurality of rope grooves, wherein each of the plurality of rope grooves generally conforms to a substantially circular shape, wherein each of the plurality of rope grooves has an opening for receiving a hoisting rope from among the set of hoisting ropes, wherein a width of the opening is less than a diameter of a respective rope groove, wherein a coating is adhesively bonded to each of the plurality of rope grooves, wherein each hoisting rope has a diameter below 8 mm, wherein each hoisting rope is composed of steel wires having a strength exceeding 2000 N/mm$^2$, and wherein a contact angle between the set of hoisting ropes and the traction sheave is greater than about 180 degrees.

12. The elevator of claim 11, wherein there is a continuous contact angle of greater than about 180 degrees between the traction sheave and the set of hoisting ropes.

13. The elevator of claim 11, wherein the contact angle on the traction sheave includes 2 or more parts.

14. The elevator of claim 11, wherein the traction sheave is roped using one of extended wrap roping, double wrap roping, and X wrap roping.

15. The elevator of claim 11, wherein the counterweight is suspended with a suspension ratio of n:1, wherein the elevator car is suspended with a suspension ratio of m:1, wherein m is an integer greater than or equal to 1, and wherein n is an integer greater than or equal to m.

16. The elevator of claim 11, further comprising:

an overspeed governor having a rope with a diameter that is greater than or equal to the diameter of each hoisting rope.

17. The elevator of claim 11, wherein the counterweight is suspended with a suspension ratio of n:1, wherein the elevator car is suspended with a suspension ratio of m:1, wherein m is an integer greater than 1, and wherein n is an integer greater than or equal to m.

18. The elevator of claim 11, wherein the counterweight is suspended with a suspension ratio of n:1, wherein the elevator car is suspended with a suspension ratio of m:1, wherein m is an integer greater than or equal to 1, and wherein n is an integer greater than m.

19. The elevator of claim 11, wherein the counterweight is suspended with a suspension ratio of m:1, wherein the elevator car is suspended with a suspension ratio of m:1, and wherein m is an integer greater than or equal to 1.

20. The elevator of claim 11, wherein the counterweight is suspended with a suspension ratio of m:1, wherein the elevator car is suspended with a suspension ratio of m:1, and wherein m is an integer greater than 1.

21. An elevator, comprising:

a set of hoisting ropes supporting a counterweight and an elevator car moving on respective tracks, each hoisting rope having a substantially round cross-section; and a hoisting machine engaging the set of hoisting ropes via a traction sheave;

wherein the traction sheave has a plurality of rope grooves, wherein each of the plurality of rope grooves generally conforms to a substantially circular shape, wherein each of the plurality of rope grooves has an opening for receiving a hoisting rope from among the set of hoisting ropes, wherein a coating is adhesively bonded to each of the plurality of rope grooves, wherein in each rope groove, the coating has a crescent-shaped cross-section, wherein each hoisting rope has a diameter below 8 mm, wherein each hoisting rope is composed of steel wires having a strength exceeding 2000 $N/mm^2$, and wherein a contact angle between the set of hoisting ropes and the traction sheave is greater than about 180 degrees.

22. The elevator of claim 21, wherein there is a continuous contact angle of greater than about 180 degrees between the traction sheave and the set of hoisting ropes.

23. The elevator of claim 21, wherein the contact angle on the traction sheave includes 2 or more parts.

24. The elevator of claim 21, wherein the traction sheave is roped using one of extended wrap roping, double wrap roping, and X wrap roping.

25. The elevator of claim 21, wherein the counterweight is suspended with a suspension ratio of n:1, wherein the elevator car is suspended with a suspension ratio of m:1, wherein m is an integer greater than or equal to 1, and wherein n is an integer greater than or equal to m.

26. The elevator of claim 21, further comprising:

an overspeed governor having a rope with a diameter that is greater than or equal to the diameter of each hoisting rope.

27. The elevator of claim 21, wherein the counterweight is suspended with a suspension ratio of n:1, wherein the elevator car is suspended with a suspension ratio of m:1, wherein m is an integer greater than 1, and wherein n is an integer greater than or equal to m.

28. The elevator of claim 21, wherein the counterweight is suspended with a suspension ratio of n:1, wherein the elevator car is suspended with a suspension ratio of m:1, wherein m is an integer greater than or equal to 1, and wherein n is an integer greater than m.

29. The elevator of claim 21, wherein the counterweight is suspended with a suspension ratio of m:1, wherein the elevator car is suspended with a suspension ratio of m:1, and wherein m is an integer greater than or equal to 1.

30. The elevator of claim 21, wherein the counterweight is suspended with a suspension ratio of m:1, wherein the elevator car is suspended with a suspension ratio of m:1, and wherein m is an integer greater than 1.

* * * * *